(12) United States Patent
Skylus

(10) Patent No.: US 10,994,842 B1
(45) Date of Patent: May 4, 2021

(54) ADAPTIVE AUTONOMOUS AIRCRAFT SYSTEM WITH MODULAR PAYLOAD SYSTEMS

(71) Applicant: Jaewon Choi Skylus, Huntsville, AL (US)

(72) Inventor: Jaewon Choi Skylus, Huntsville, AL (US)

( * ) Notice: Subject to any disclaimer, the term of this patent is extended or adjusted under 35 U.S.C. 154(b) by 516 days.

(21) Appl. No.: 15/897,154

(22) Filed: Feb. 15, 2018

Related U.S. Application Data

(60) Provisional application No. 62/458,711, filed on Feb. 14, 2017.

(51) Int. Cl.
| | |
|---|---|
| *B64D 5/00* | (2006.01) |
| *B64D 1/08* | (2006.01) |
| *B64D 7/08* | (2006.01) |
| *B64D 1/12* | (2006.01) |
| *B64C 1/10* | (2006.01) |
| *B64C 30/00* | (2006.01) |
| *B64C 37/02* | (2006.01) |

(52) U.S. Cl.
CPC .................. *B64D 5/00* (2013.01); *B64C 1/10* (2013.01); *B64C 30/00* (2013.01); *B64C 37/02* (2013.01); *B64D 1/08* (2013.01); *B64D 1/12* (2013.01); *B64D 7/08* (2013.01)

(58) Field of Classification Search
CPC .......... B64C 1/10; B64C 30/00; B64C 37/02; B64C 2201/082; B64D 1/08; B64D 1/12; B64D 5/00; B64D 7/08
See application file for complete search history.

(56) References Cited

U.S. PATENT DOCUMENTS

| | | | | |
|---|---|---|---|---|
| 4,256,012 | A * | 3/1981 | Cowart | B64D 1/08 |
| | | | | 244/118.1 |
| 4,802,639 | A * | 2/1989 | Hardy | B64C 37/02 |
| | | | | 244/137.4 |
| 2012/0251280 | A1 * | 10/2012 | Jaurand | B64D 1/12 |
| | | | | 414/507 |
| 2016/0274581 | A1 * | 9/2016 | Lin | H04W 4/70 |
| 2017/0144762 | A1 * | 5/2017 | Retig | B64C 39/024 |
| 2019/0315462 | A1 * | 10/2019 | Skladman | B64D 3/02 |

* cited by examiner

*Primary Examiner* — Rodney A Bonnette
(74) *Attorney, Agent, or Firm* — George P Kobler

(57) ABSTRACT

An autonomous aircraft system an airframe configured with a ventrally located payload bay open to the empennage of said airframe and payload bay terminating with a forward bulkhead which is configured to receive a payload module. The payload bay and the payload module are configured with corresponding fittings for connecting the payload module to the aircraft control systems and for securing the payload module within the payload bay.

30 Claims, 19 Drawing Sheets

ADAPTIVE AUTONOMOUS AIRCRAFT SYSTEM WITH MODULAR PAYLOAD SYSTEMS

CROSS-REFERENCE TO RELATED APPLICATIONS

This application claims priority to U.S. Provisional Application No. 62/458,711, filed Feb. 14, 2017.

BACKGROUND

Field

The present disclosure relates generally to aerospace vehicles, and more particularly, to autonomous aircraft systems having modular payload adaptations.

Description of the Problem and Related Art

The rapid surge in consumer demand for mobility, connectivity, and access to content has fundamentally changed the space-based services industry. Space, as the ultimate vantage point or high ground, is becoming increasingly popular for communications, Earth observations, connectivity, and more. At the same time, there has been an emergence in technologies to drive down the cost and size of the space assets, i.e. satellites, themselves. Modern technologies demand rapid deployment with a high rate of upgrades and refresh rate. Similarly, unlike traditional satellites, many modern satellites require faster hardware updates and thus significantly higher launch frequency to orbit. The launch services industry, however, is not equipped to handle this transition. Conventional launch systems are designed for high cost, large satellites that are designed to last as long as possible. Accordingly, conventional launch systems were not engineered to launch with high frequency, reliability, flexibility, and low costs. As a consequence, these conventional launch systems are not suitable for use in delivery services for many of today's satellites.

What is needed is a delivery system that enables the expansion of the existing logistics infrastructure into the space domain to cover logistical destinations requiring suborbital, orbital, and supraorbital flights. Additionally, such delivery services and its operations must be adaptable to a wide range of cargo, which may vary in mass, size, functionality, destination, and more. Conventional launch systems are not adaptable to major variations in cargo and are extremely expensive for several reasons. First, conventional launch systems require specialized launch sites, equipment, and substantial crew which all drive up cost, schedule, and complexity. Second, conventional launch systems are highly dependent on weather, which greatly influences its reliability and availability. For commercial businesses which need to reliably access space on a specific day and time, conventional launch systems often fail. Third, conventional launch systems are expendable incurring massive hardware costs for the launch operator. While reusability has gained some attention from the industry in recent times, significant improvements in the economics of reusable launch systems have not yet been demonstrated in practice.

As the size of the conventional launch system scales down with the decrease in the size of the payload, the negative effects of the above-mentioned factors on the economics of launch increase. A conventional, vertically-launched rocket system, albeit smaller in size, still requires all of the same launch sites, specialized equipment, operations, and ground crew as the similar larger launch system. However, since the amount of payload delivered to space is far less in the smaller launch system, the economics are significantly worse. Furthermore, since the forces of nature, flight perturbations, and weather do not scale down with a smaller launch system, such launch system with much smaller mass inertia, far less performance margin, and lower mass fractions, resulting from the inability of individual components to scale down, face significantly reduced launch windows for successful spaceflight. Historically, small launch systems have demonstrated a failure rates of 50% to 95% depending on which launch systems one considers "small." When compared to the history of single digit rates of failure for the similar large launch systems, the failure rates of the smaller launch systems are unreliable and illustrates the heightened difficulties that rise when launch systems are scaled down in size. Further considerations of other factors, including the expendable designs of small, conventional launch systems, make the economics even worse.

The present disclosure proposes an adaptive, unmanned aircraft system with modular payload systems. Consideration of the launch vehicle, ground operations, and mission management as a single product is essential for launch capability comparable to terrestrial delivery services that is reliable and on-demand. The present invention has been designed as a single, integrated product with reconfigurability, modularity with standard interfaces, interoperability with existing ground infrastructure, and responsiveness with reliability at its core. The present invention utilizes standard runways and existing infrastructure for suborbital, orbital, and supraorbital launches. And due to its drastically higher performance, its dependence on weather is minimum.

The adaptive, unmanned aircraft system (UAS) takes-off and lands on standard runways, which significantly increases the choice of operational sites. Specialized equipment, such as transporter-erectors or launch pads, are not needed. Instead, the entire launch operations are contained to standard hangars and the runways resulting in thousands of options for operational sites. The modular payload systems enable the adaptive, unmanned aircraft system to perform delivery services for, not just space cargo, but for virtually any type of cargo majority of which possess terrestrial utility.

Flight operations are massively simplified by the modular payload systems and thus requires smaller crew resulting in large decreases in operational costs. The modular payload systems in combination with the adaptive UAS's enables the ultimate flexibility that includes, but not limited to, optimization of flight and performance properties of the UAS as deemed necessarily suited to the mission, which may be defined by the payload modules, parallel operations of integration, assembly, test, and adaptive UAS flights, and more. Parallel processing capability of the modular payload systems enables mission and space traffic management with minimal delay. Some of the advantages of the present invention are described herein using the launch module as a specific illustration, which configures the adaptive UAS to air-launch aerospace vehicles for atmospheric flights and suborbital, orbital, and supraorbital launches.

There exists prior art which air-launched rockets from manned carrier aircraft. However, as is described in detail below, none are successful in providing the advantages they claim when reduced to practice. More importantly, while the methods described in prior art appear similar in method as one described herein, the air-launches performed by the systems described below are drastically different because they overcome all of the hurdles that prevent horizontal take-off, air-launch systems from being advantageous over conventional launch systems in practice.

Elias, et al., in U.S. Pat. No. 4,901,949, disclose a variation of a horizontal take-off, air-launch system where a multi-stage rocket vehicle is air-launched from carrier aircrafts, such as Boeing 747, Boeing 757, Lockheed L1011, Lockheed C-130, or Boeing B-52. The use of these aircraft requires that it be piloted with humans on-board. Elias, et al., and other similar prior art already detailed discussions on the hazards associated with air-launching from a carrier aircraft, whether from atop of such carrier aircraft, from the underside of such carrier aircraft, etc. Due to these hazards, any launch vehicle that is air-launched from any manned carrier aircraft must also be human-rated to minimize the hazards and risks associated with the air-launch process. The carrier aircraft are large that were not originally designed for air-launching launch vehicles and requires a specialized crew to perform its complex operations. The human rating requirement demands that there be no single points of failure, higher component factors of safety, heightened qualification testing requirements, etc. and significantly drives up the costs associated with the air-launched vehicle and its operation.

Furthermore, in practice, the economics and performance of such air-launch methods is actually worse than a ground launched system of equal performance. The operational costs of large, manned carrier aircraft are very high as it's subject to flight crew safety, regulatory compliance requirements, safety requirements, and performance limitations of manned carrier aircraft systems. One obvious way this performance loss presents itself is in the free fall drop period of the air-launched vehicle. After the launch vehicle is released from the carrier aircraft at some elevated altitude, the launch vehicle is subject to a crucial delay prior to ignition to establish powered flight. The ignition delay ensures that the air-launched vehicle achieves a safe, physical separation distance from the carrier aircraft before ignition to minimize the consequences of failure to levels acceptable for manned operations. During this free-fall period, the air-launch vehicle loses altitude and nearly all of the positive velocity acquired from the carrier aircraft. In other words, in practice, the air-launched vehicle loses nearly all of the kinetic and positive energy claimed by prior art. In addition to this, the air-launched vehicle gains negative velocity under the acceleration of gravity as it falls back towards the Earth. Then, upon ignition, the air-launched vehicle is taxed with performance required to decelerate, then accelerate back to positive velocities required for a given mission. The most interesting bit is that when a ground launched vehicle, that is equal in performance to the air-launched vehicle, is observed at the same altitude that the air-launched vehicle attains zero velocity by decelerating from the negative free-fall velocity, the ground launched vehicle already has positive velocity and significantly more favorable performance characteristics at the same altitude. The energy bled in this transition makes air-launch methods described in prior art worse in economics and performance in comparison to a ground launched vehicle of equal performance. Furthermore, due to the energy lost in this transition, any claims of prior art involving air-launch on reduced gravity losses, drag losses, aerodynamic losses, and improved launch economics has been questionable at best in practice. To illustrate this point, the latest air-launch mission performed by a Pegasus XL rocket from Orbital's manned, L-1011 aircraft cost NASA $55 million in 2016 to deliver about 231 kilograms of payload to low Earth orbit. For nearly the same price of $62 million, the ground launched Falcon 9 launch vehicle from Space Exploration Technologies Corp. routinely delivers thousands of kilograms to low Earth orbit and has a max payload capacity well over 10,000 kg to low Earth orbit. The resulting unit economics of around $238,000 per kilogram of the Pegasus XL vehicle air-launched from the manned, L-1011 aircraft is drastically worse than the around $2,700 per kilogram of the ground-launched Falcon 9.

The system described below is unmanned and it removes pilot performance and safety limitations. The adaptive UAS allows for the use of virtually any rockets, including rocket that are not human-rated, for launch. The reduction in safety requirements, allows the release and ignition of the air-launched vehicles at aggressive orientations, higher velocities, and reduced separation from the adaptive UAS than manned systems.

This enables optimized trajectories that do not bleed energy in transition and lowers the energy requirements, cost, and complexity of the air-launch vehicle. The adaptive UAS is allowed higher accelerations than manned carrier aircraft, which opens up the optimum flight profiles that contribute energy to the air-launched vehicle. The resulting boost to the orbital velocity and performance of the air-launched vehicle from the adaptive UAS enables the use of drastically smaller, lower cost air-launch vehicles. The adaptive UAS functions more as a reusable booster stage rather than merely a carrier aircraft. For instance, in certain missions, the adaptive UAS will accelerate to supersonic velocities prior to air-launching the rocket vehicle for suborbital, orbital, or supraorbital flight. The additional kinetic energy imparted from the adaptive UAS to the air-launched vehicle increases the payload capacity of the air-launched vehicle. The energy bled in transition is also minimum as the air-launched vehicle ignites and establishes self-powered flight nearly instantaneous, and in some missions, even before the physical separation. Furthermore, albeit the air-launched vehicle is small, flight perturbations and environmental influences on the air-launched vehicle is reduced due to the elevated altitudes of the air-launch, where the atmospheric densities are low and perturbations are minimum, in addition to the favorable separation dynamics enabled by the adaptive UAS as described above. The reusability of such launch system using the adaptive UAS as the booster stage may be as high as 90% by dry mass, which yields an unprecedented increase in re-used hardware per launch.

Moreover, when acting as a booster vehicle for space launch missions, the adaptive UAS has major improvements over conventional rocket boosters. Unlike conventional boosters of launch systems, the adaptive UAS does not carry an oxidizer system and its airbreathing propulsion system has at least twice the specific impulse, i.e. fuel efficiency, than the greatest performing rocket system. The omission of the oxidizer system in addition to the increase in specific impulse drastically boosts the mass margin of the adaptive UAS allowing for virtually limitless variations in the types of cargo carried by the adaptive UAS and the missions it performs. Furthermore, the resulting higher performance margin makes the adaptive UAS robust against weather, environmental forces, and flight perturbations, which increases its reliability and availability against any other ground launched systems or air-launched systems of comparable performance.

The cruise capability of the adaptive UAS in addition to its robustness to environmental influences drastically increases the launch window and flexibility for any given mission as the adaptive UAS can fly above inclement weather, around adverse conditions, and cruise to unpopulated areas, such as the open ocean, and perform air-launch missions to any orbital inclinations from a given operational origin.

The autonomous functionality of the adaptive UAS combined with the modular payload system significantly reduces the size of the crew required to for maintenance and operations and improves flexibility. This decreases the costs and logistical footprint yielding far better economics for delivery services that include space launches. Parallel operations enabled by the modular payload system allows missions, including launch missions, to be pre-integrated and readied for flight such that the adaptive UAS mean-time-between-flights may be less than 3 hours. The software applications, avionics, instrumentation, and the adaptive architecture of the adaptive UAS enables functionalities to collect data, analyze quasi-patterns, self-reconfigure, improve, and optimize its performance for every mission and the types of payload associated with them. This makes many key aspects the adaptive UAS, such as flight control laws, performance characteristics, mission constraints, etc., software-defined yielding the ultimate flexibility limited only by the limitations of the state-of-the-art hardware.

BRIEF DESCRIPTION OF THE DRAWINGS

The presently disclosed system is described with reference to the accompanying drawings. In the drawings, like reference numbers indicate identical or functionally similar elements. Additionally, the left-most digit(s) of a reference number identifies the drawing in which the reference number first appears.

FIG. 1H is a plan view of the rear of the aircraft of FIG. 1A;

DETAILED DESCRIPTION

Figure 1A:
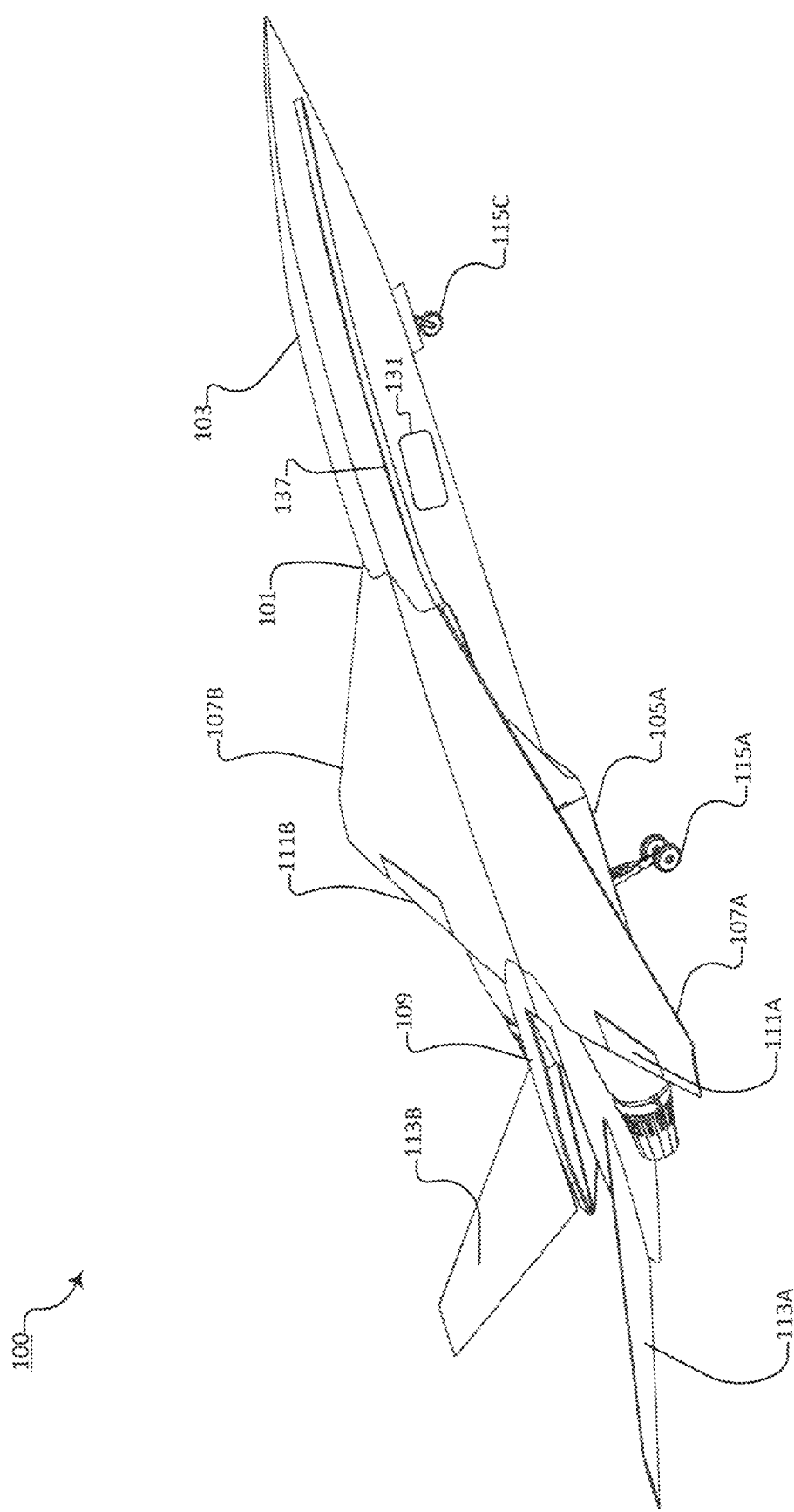
FIG. 1A is an elevational view of an exemplary unmanned aircraft according to one embodiment.
Figure 1B:
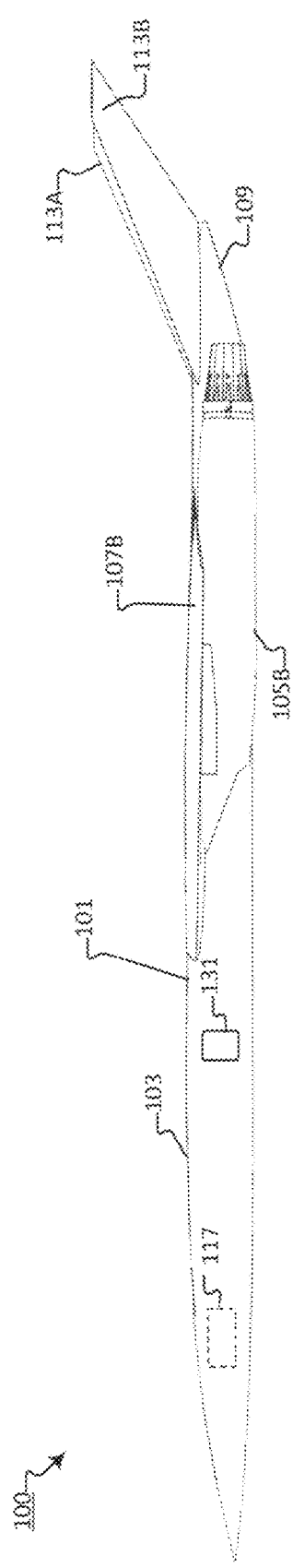
FIG. 1B is a plan view of the ventral side of the aircraft of FIG. 1A.
Figure 1C:
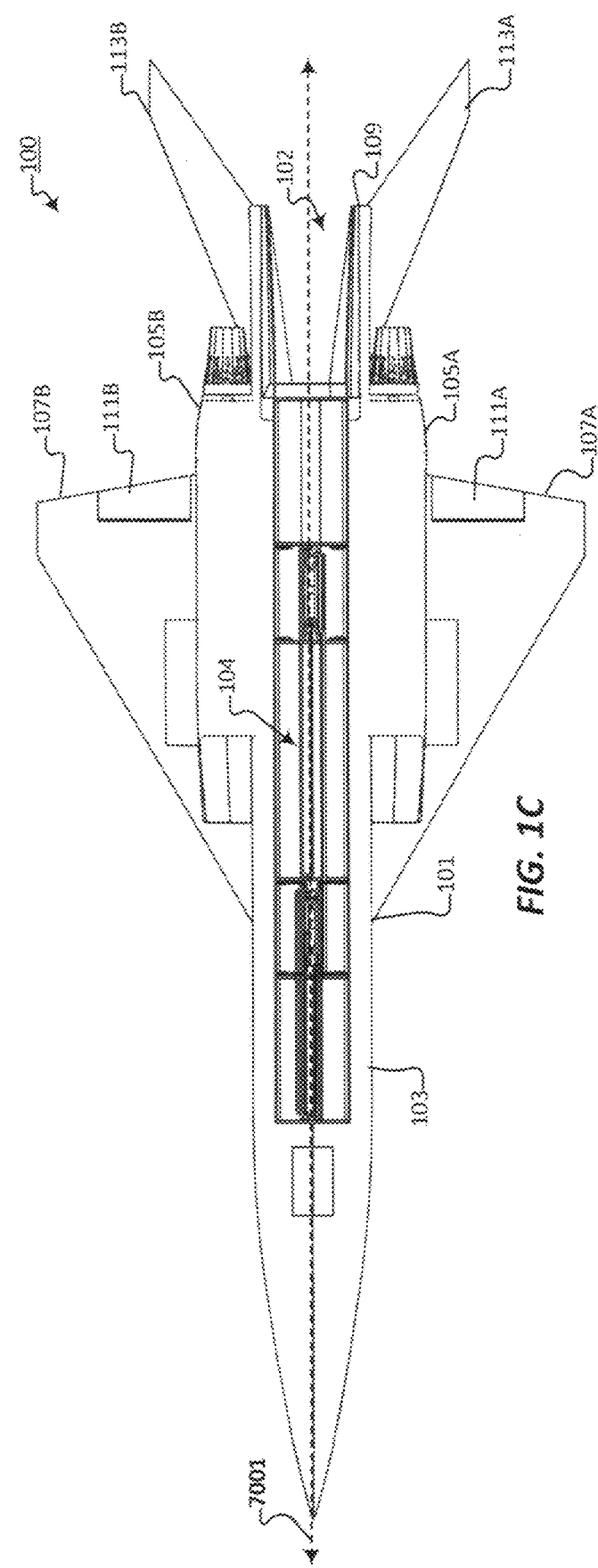
FIG. 1C is an elevational view of the aircraft of FIG. 1A from the perspective of the nose of the aircraft.
Figure 1D:
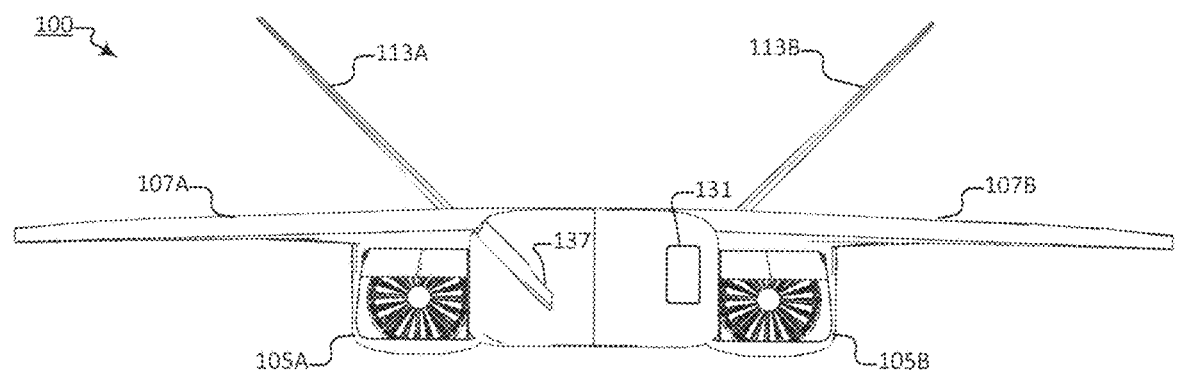
FIG. 1D is perspective view of the aircraft of FIG. 1A from the front left dorsal side with fuselage skin sections omitted showing the internal bays of the aircraft.
Figure 1E:
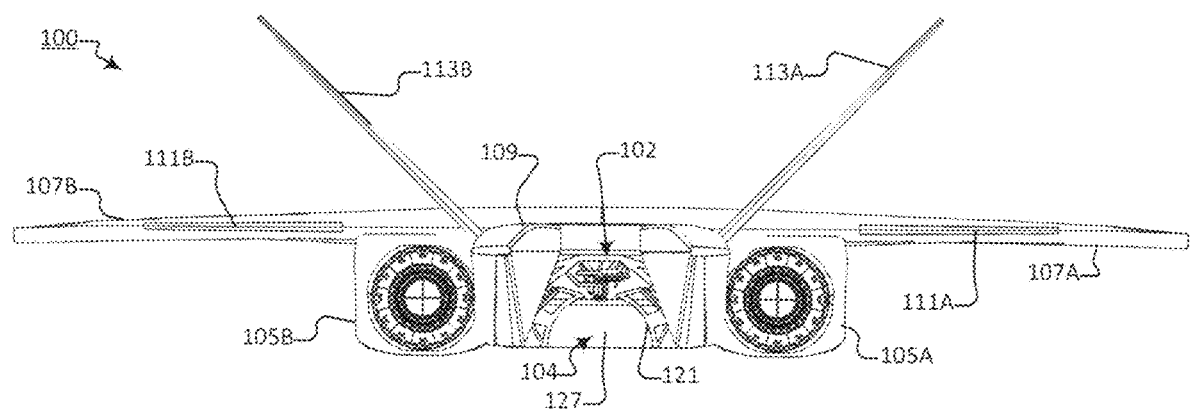
FIG. 1E is a perspective view of the ventral side of the aircraft of FIG. 1A from the rear of the plane.
Figure 1F:
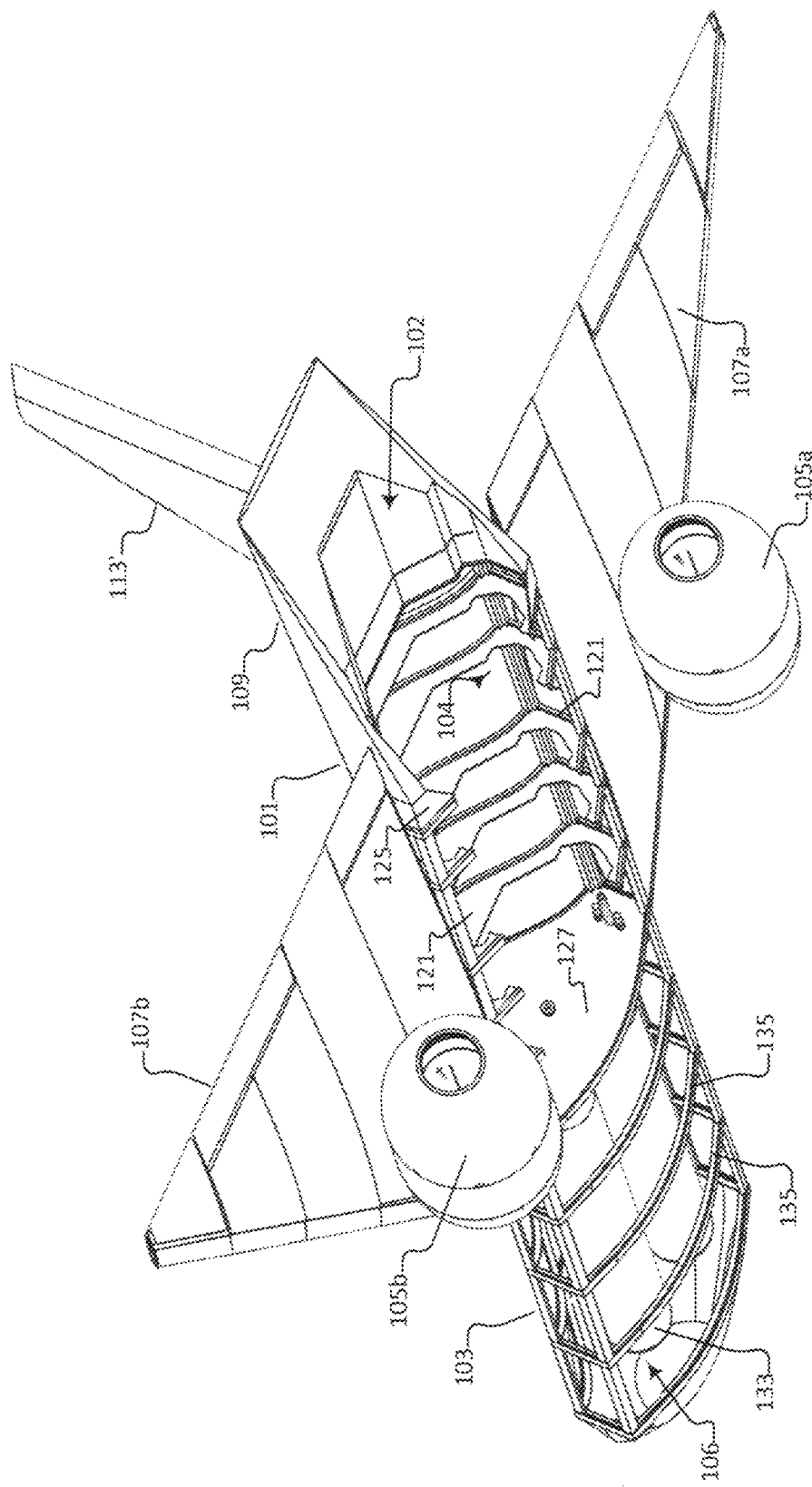
FIG. 1F is a perspective view of the ventral side of the aircraft of FIG. 1A.
Figure 1G:
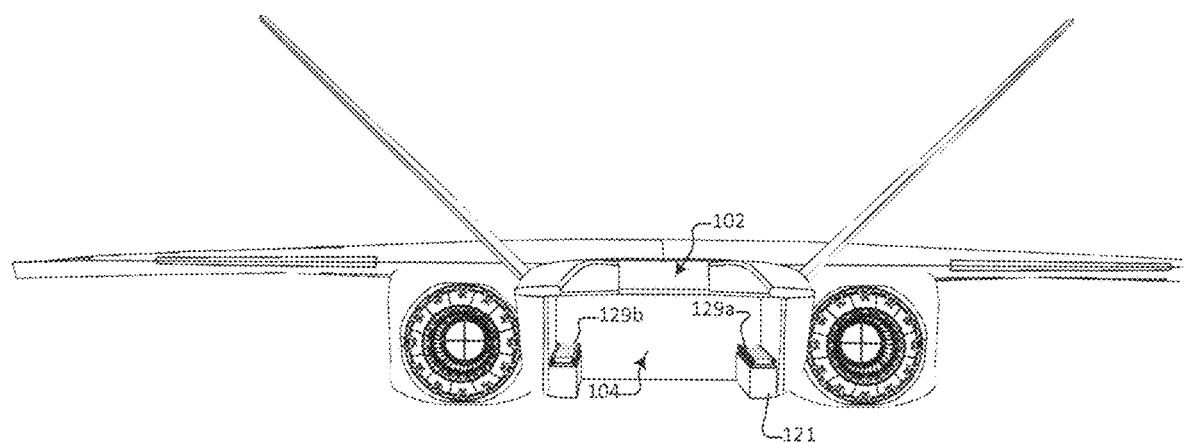
FIG. 1G is a plan view of the ventral side of the aircraft of FIG. 1A.

The various embodiments of the system are described below, and their advantages are best understood by referring to FIGS. 1A through 10 of the drawings. The elements of the drawings are not necessarily to scale, emphasis instead being placed upon clearly illustrating the novel features and principles of operation. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

Directionally or spatially descriptive terms, such as "forward," "rearward," "aft," "right," "left," "port," "starboard," "longitudinal," "lateral," any derivations of the foregoing as well as similar terms, will be understood with respect to the airframe shown in the figure referenced in the description.

As used herein, an autonomous aircraft system may comprise manned or unmanned flying systems such as winged aircraft such as airplanes, gliders, lifting bodies, etc., or vehicles without lifting surfaces of the type that are sometimes referred to as aerospace vehicles. Flying systems may also be hybrids of multiple aerospace vehicle types. Examples of hybrid flying systems include rocket powered aircraft system, powered or unpowered balloons, airbreathing rocket systems, a glider towed by another aircraft, and other systems and vehicles that fly. While the autonomous aircraft systems described herein are referred to as unmanned aircraft systems (UAS), those skilled in the relevant arts with the benefit of this disclosure will appreciate the embodiments described below are equally applicable to manned autonomous aircraft systems as well.

Further, UAS may be understood to be any unmanned aircraft, for example, drones, remotely-controlled aircraft, autonomous aircraft, gliders with wireless communications capabilities, self-piloting aircraft, aircraft with global positioning system (GPS) devices, and aircraft controlled by software. UAS may also be hybrid devices that combine the functionality of multiple unmanned aircraft systems. Examples of hybrid unmanned aircraft systems include an autonomous aircraft with remote-control capability enabled with GPS and wireless communication capabilities or a software-augmented remote piloted aircraft. These are merely illustrative examples and should be understood that the presently described system should not be limited to such examples.

FIG. 1A through 1G present a first exemplary embodiment of an unmanned aircraft 100. Such an aircraft 100 is suitable for numerous applications such as, but not limited to, for orbital, supraorbital, and suborbital launch of payloads, for cargo transportations, for drone deliveries, for emergency response, for surveillances, and for logistics. The aircraft 100 comprises an airframe 101 having a fuselage 103, and empennage 109 and starboard and port wings 107a, b extending laterally from the fuselage 103 in a delta configuration. Aircraft 100 propulsion is carried out by starboard and port engines (not shown) mounted in nacelles 105a, b under each wing. In this embodiment, the ventral side of the empennage 109, comprises an opening 102 defined therein that leads to a ventral payload bay 104 that extends forward from the opening to roughly midway along the fuselage 103 and is terminated by a bulkhead 127. It will be understood, however, bulkhead 127 may be located any distance along the length of the aircraft 100. For example, bulkhead 127 may be located forward or aft of the forward tip of the root chord of wing 107a, b.

Forward of the bulkhead 127, a fuel and service bay 106 is defined within the airframe which houses a flight and mission management system package 117, described in greater detail below, and one or more fuel tanks 133. The fuel and service bay 106 may also house payload servicing systems (not shown) as well. The forward fuselage 103 comprises a plurality of conventional transverse frame members 135 that support the aircraft skin. Moving aft, the payload bay 104 also comprises a plurality of transverse frame members 121 that are open on the ventral side, the opposing ends of the frame members 121 terminating inward with ends 125 extending toward the center of the aircraft body. Payload servicing systems (not shown) provide data interface between the aircraft flight and mission management systems 117, and, optionally, payload fuel, and servicing modules. It will be understood that fuselage 103 may have one or more payload bays 104 on the aft, forward, side, top, and/or bottom of aircraft 100 with appropriate modification to account for aerodynamic characteristics of the airframe 101 for accommodating a variety of payload modules.

Propulsion may be provided by one or more engines, not shown, which may be mounted through nacelles 105a, b under each wing. aircraft 100 may have one or more control surfaces 111a, b on wings 107a, b which may provide roll control. Aircraft 100 may have one or more tail control surfaces 113a, b which may provide yaw and pitch control, and conventional landing gear 115a, b & c. Left and right rail guides (FIG. 1G: 129a, b) may optionally be attached to the top portions of the inward ends 125.

In one alternative embodiment, Aircraft 100 may have one or more display devices 131 or user interface devices (preferably a touch screen display, accessible from the outside of the aircraft for user access to the onboard flight management system. Given this access, an operator may program the onboard computers, described in detail below, without having to take the aircraft out of service to update flight management system firmware. Additionally, the aircraft 100 may also comprise a status indicator light 137, show in the figures as a light strip disposed along the forward fuselage 103, that can provide the operator an indication of system status.

A variety of engine systems may be employed to achieve the characteristics of the UAS described herein. Engines are preferably turbofan or turbojet designs that can achieve about 3,600 to 60,000 lbf of combined thrust. One suitable engine is found in the FJ33 model built by Williams International of Commerce Town, Mich. Other suitable candidate engines are the Williams International FJ44, Pratt and Whitney F100 series, General Electric F110 series, and General Electric J79 and J85. Engines are preferably robust with high reliability and low down time and servicing costs. It should be borne in mind that the engine specifications are suited to the size of the aircraft and the size of the expected payload. Accordingly, engines of greater thrust may be needed to successfully launch larger payloads.

Airframe 101, which may include a frame and external skin, may be formed of any suitable materials, now known or hereafter developed, including plastic, metal, ceramic, composite, or any other suitable materials, or any combination of these materials. Airframe 101 or portions thereof may be made from dielectric or other low-conductive materials, so that the operation of conductive transceiver elements that are located in proximity to airframe 101 is not disrupted. On the other hand, portions of airframe 101 may be formed from conductive materials such as metal. In one exemplary embodiment, airframe 101 may advantageously comprise a high temperature carbon composite. As will be appreciated by those skilled in the relevant arts, carbon composite materials are light in weight and, when used with a high temperature resin, has desirable thermal and strength properties. When desired for technical purposes, metals may be used for the airframe 101 of aircraft 100, such as aluminum, stainless steel, titanium, alloys of these metals like inconel alloys and other metals, etc.

It will be understood that if a metal is used to form portions of the airframe, one or more of that metal portion may be used as part of the transceivers of aircraft 100. These metal portions may also be exposed on the surface of airframe 101. In a preferred embodiment, airframe 101 is a monocoque design with aluminum structures and carbon composite, load bearing skins. such that the carbon composite elements function as both airframe 101, and the primary load bearing structures with transverse frame members which may be made of aluminum functioning as load distribution members to prevent the carbon composite elements of airframe 101 from bulking. Carbon composite material may be used as the load distributing members as well.

Airframe 101 may be assembled using any suitable assembly techniques including screws, bolts and nuts, bonded joints, welded joints, press fit, etc. In one embodiment, a suitable assembly technique for the airframe employs the use of bonded joints. Examples of bonded joints are butt joints, lap joints, double lap joints, mortise and tenon joints, tapered butt joints, tapered lap joints, etc. Non-bonded assembly techniques may also be employed for airframe 101 as well. Examples of non-bonded assembly techniques are friction stir welding, inert gas welding, bolted joints, etc.

Fuselage 103 may be formed of any materials similar to the airframe to prevent mismatch between materials under loads, such as thermal expansion mismatch, while serving as the main load-bearing structure of aircraft 100. Fuselage 103 may also comprise one or more hard points for structural coupling with wings 107a, b, empennage 109, tail control surface 113a, b, nacelles 105a, b, and landing gear 115a-c, etc.

The airframe 101 is designed to minimize weight while enabling effective center of gravity (CG) and configuration management. The load path for flight loads, thrust, and transient dynamics is managed through main load bearing structures. The integrated payload bay 104 design of the airframe 101 to accommodate an upper stage launch vehicle (rocket) allows large diameter, high energy orbital launch vehicles with stable flight characteristics and offset allowable CG. The exemplary airframe depicted herein is designed to reach speeds of up to about Mach 3.0 or greater. However, it should be noted that subsonic airframe designs, depending on mission requirements, are contemplated to be within the scope of the present disclosure. The preferred vehicle aspect ratio is maintained with a wing span of about 35 feet and a total wing area of about 710 ft2 with a length of about 73.6 feet. Those skilled in the relevant arts will appreciate that the aerodynamic dimensions of the aircraft may be greater or lesser depending on the size of the payload desired to be launched. Thus, while the above may be a preferred embodiment, the design may be scaled up or down depending on the requirements of the mission.

Figure 2:
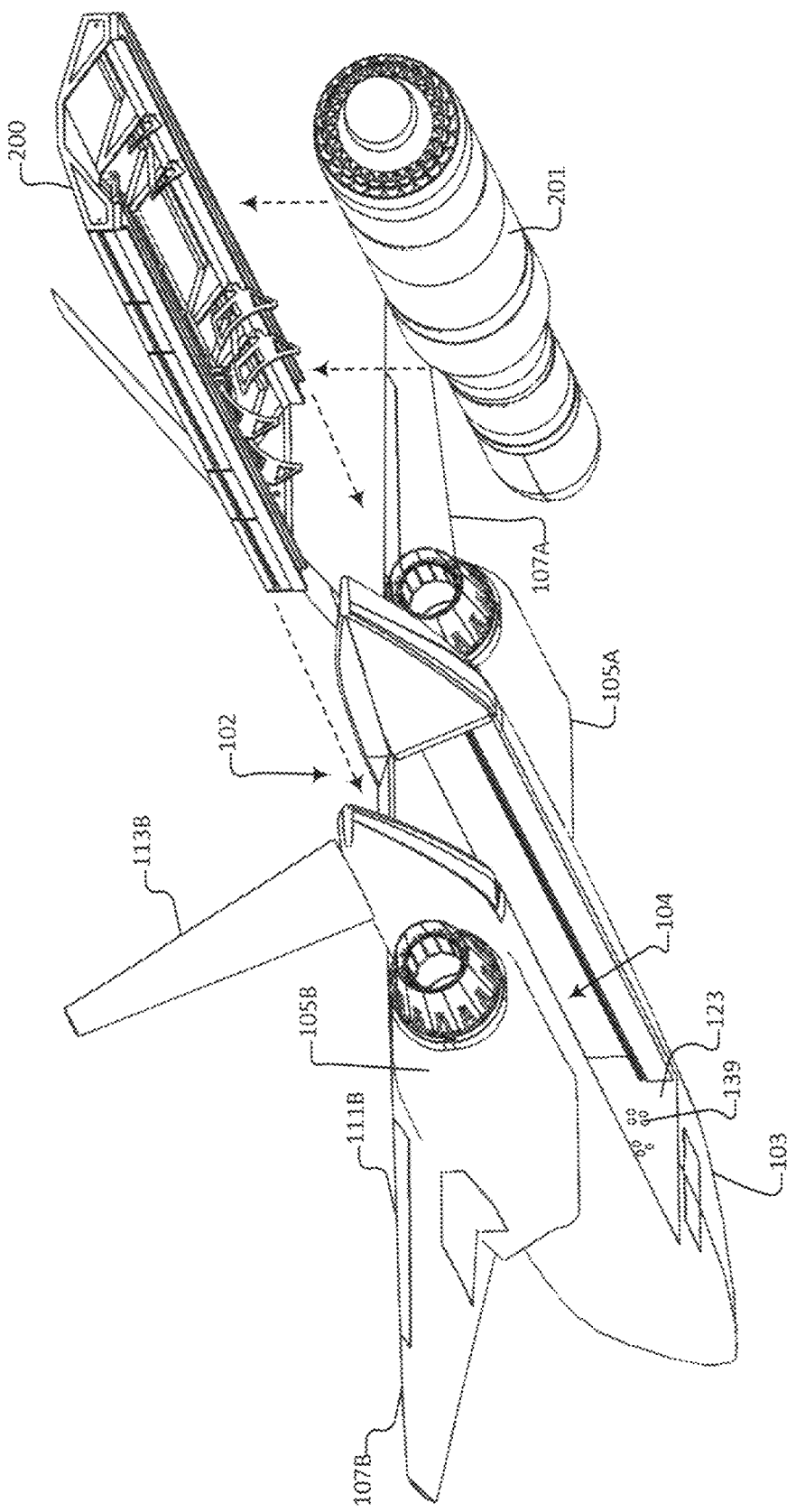
FIG. 2 is a perspective view of the ventral side of an exemplary unmanned aircraft from the rear.
Figure 3A:
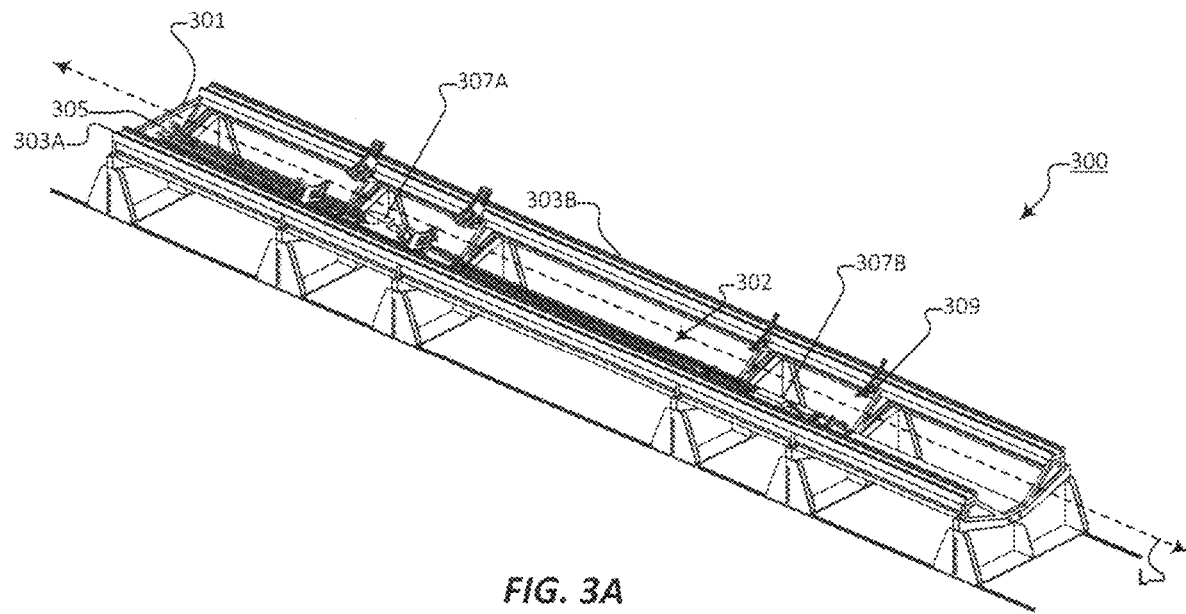
FIG. 3A is a top perspective view of an exemplary payload module.
Figure 3B:
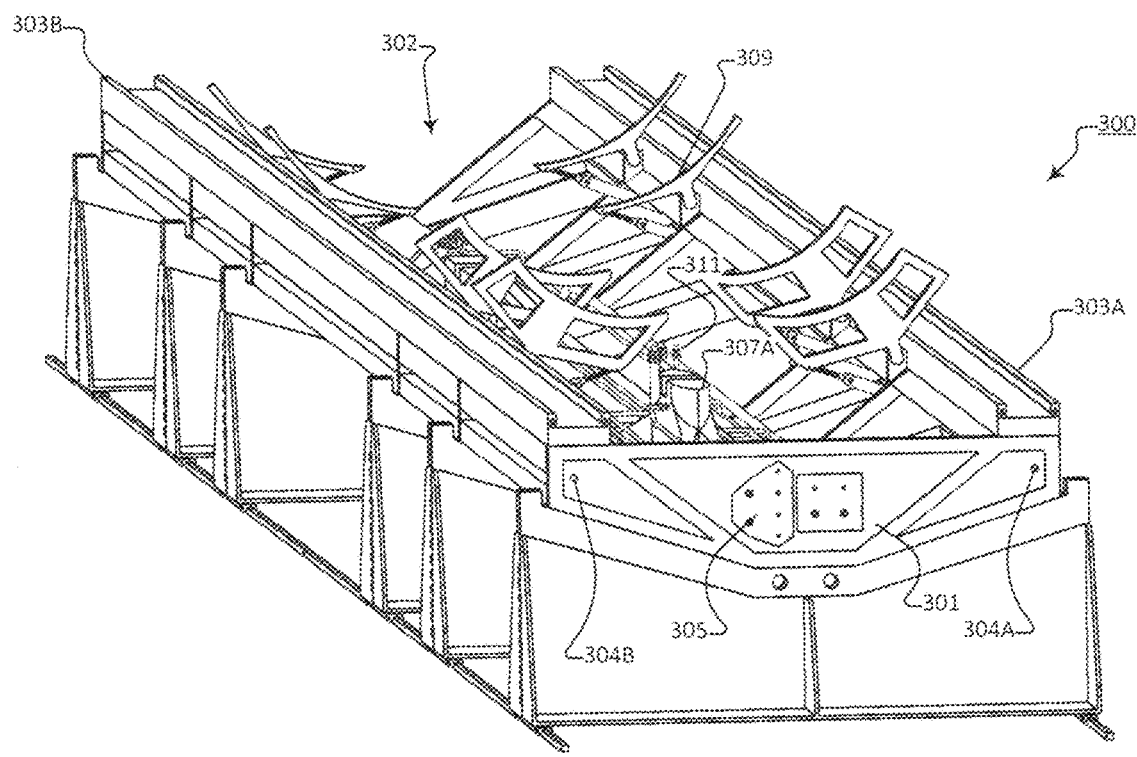
FIG. 3B is a second perspective view of the payload module of FIG. 3A.

FIG. 2 depicts the ventral side of the UAS 100 to clearly illustrate the opening 102 and payload bay 104. The UAS further comprises removable, reusable payload module 200 that provides integration interface between a payload 201 and the aircraft 100. FIGS. 3A & 3B present perspective views of an exemplary payload module 200 displaying the ventral side thereof. In this embodiment, the payload module 200 comprises a generally rectangular body with a longitudinal axis L that extends roughly parallel with that of the aircraft 100. An exemplary payload module 200 is formed with two lateral rails 303a, b and a bulkhead 301 disposed at the forward end of the module. The bulkhead 301 includes one or more payload quick connect fittings 305 defined through the bulkhead 301 for connecting the installed payload with the UAS flight management system and payload servicing systems. Further, payload module bulkhead 301 includes two or more connection points 304a, b for securing the payload module 200 to the bulkhead 127 as will be described in greater detail below. The body of the payload module 200 comprises an elongated, ventral cavity 302 with an open rearward end. The payload module 200 preferably comprises one or more hard points of attachment 307 to connect the payload to the payload module 200. Hard points 307 include latches 311 that extend downward into the cavity 302 are maintained in a closed position. Latches 311 are configured to be remain in a closed position and may be selectively actuated open to release the payload when separation command is activated to allow the payload to separate from the aircraft 100. The module 200 further comprises a plurality of separation pusher arms 309 located in the tray cavity 302 that ensure physical separation of the payload from the aircraft 100 while mitigating undesirable moments from being imparted on the payload at separation. During integration of the payload with the payload module 200, separation pusher arms 309 are pre-loaded during the integration process to a retracted position when securing the payload in place. The separation event occurs with latches opening while the pusher arms are pneumatically actuated to a full extended position.

The dorsal side of the payload module 200 may be formed with a shape formed to fit within the openings defined by the shaped internal edges 123 of the payload bay 104 transverse frame members 121. When loading the payload module 200 onto the aircraft 100, the forward end of the payload module 200 is inserted into the rear opening 102 with the rails 303a, b of the payload module 200 resting on the inward ends of the transverse frame members or the linear rails 129a, b and urged forward along the payload bay 104 until the forward bulkhead 301 of the payload module opposes bulkhead 127.

Figure 3C:
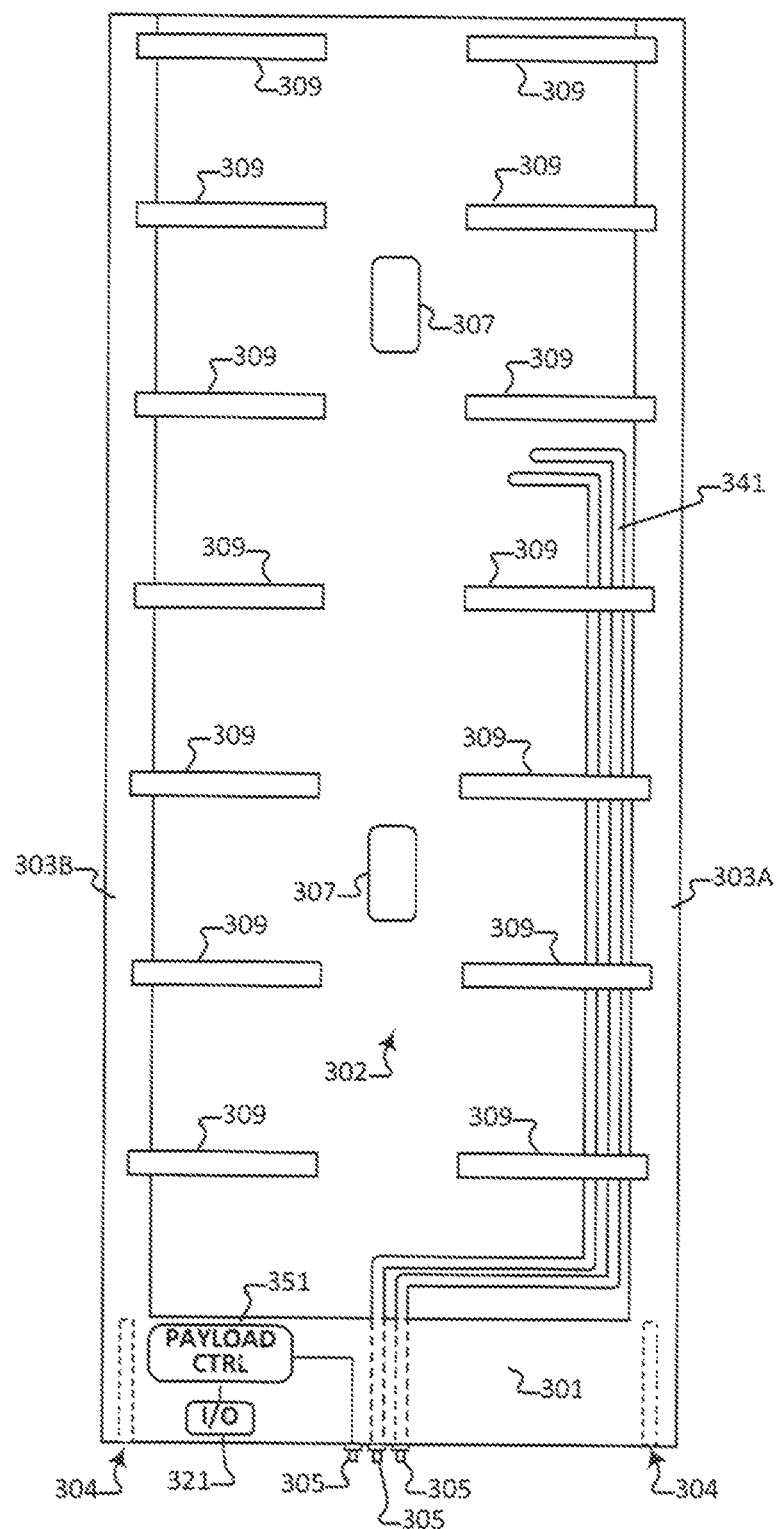
FIG. 3C is a top plan view of the exemplary payload module of FIG. 3A.

In another embodiment illustrated functionally in FIG. 3C, payload module 200 may further comprise a computer-based payload control module 351 which is configured with software that executes functions of allowing the payload module 200 to communicate with both the aircraft mission computer (described below) and the payload itself, should the payload be configured with a similar computer-based controller. Payload control module 351 may also comprise storage media for storing mission data, profile data, navigation to allow the payload control module 351 to execute the mission in an autonomous fashion. In yet another embodiment, the payload module 200 comprises one or more input-output (I/O) devices 321 for interface with the payload control module 351 by an operator. Such I/O devices include, without limitation, audio or visual displays, including LED, LCD, OLED displays, keypads, etc. In a preferred embodiment, the display device may be a touch screen. This touch screen may be used for configuring the payload module for integration to aircraft 100.

FIG. 4 shows three possible versions of the exemplary payload module described above. However, it will be apparent to those skilled in the relevant arts that payload modules 200 may be modified in a great number of ways in design and functionality to carry out the missions of the UAS as contemplated in this disclosure.

Figure 4A:
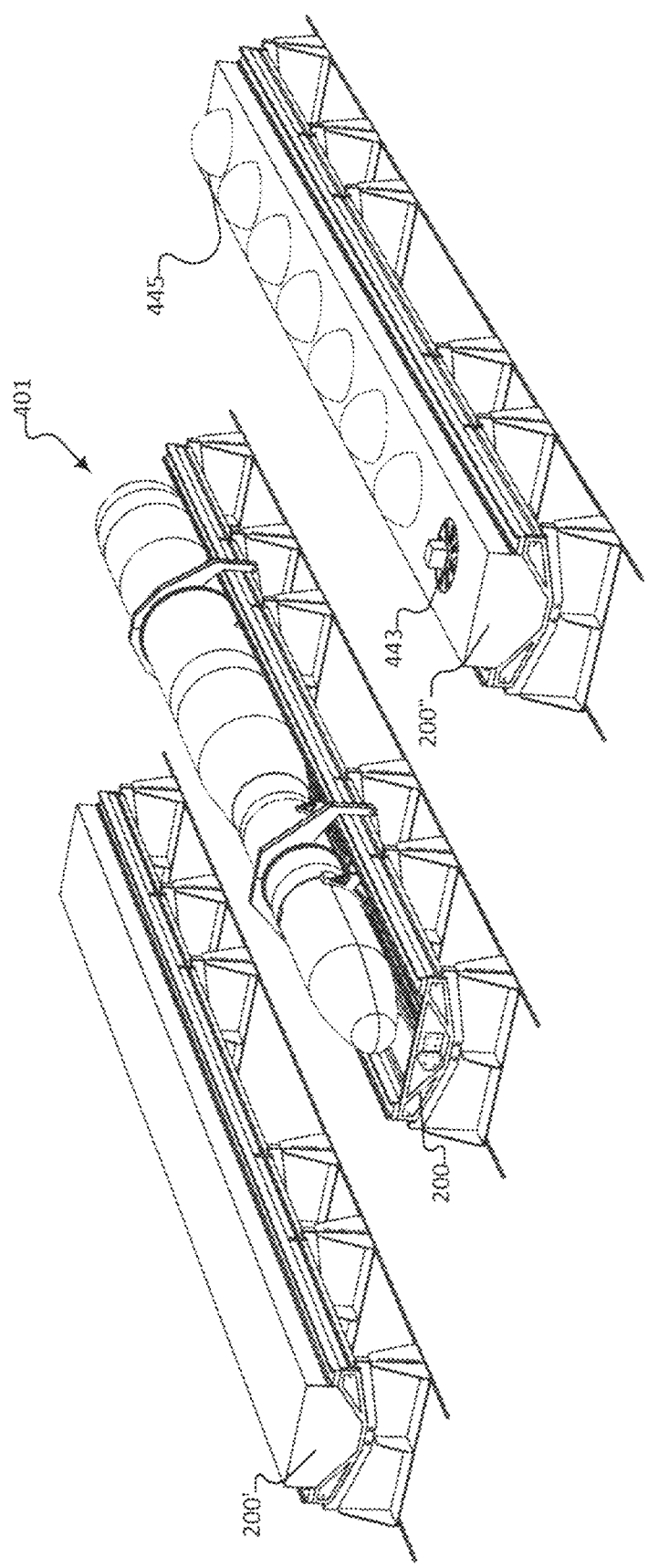
FIG. 4A illustrates three exemplary payload configurations for a payload module.
Figure 4B:
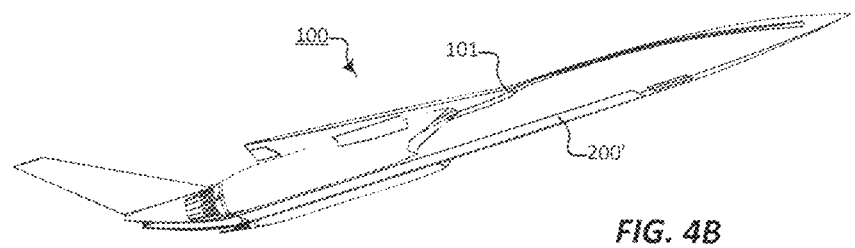
FIGS. 4B through 4D depict the various payload configurations of FIG. 4A as the payload module is mounted on an exemplary unmanned aircraft.
Figure 4C:
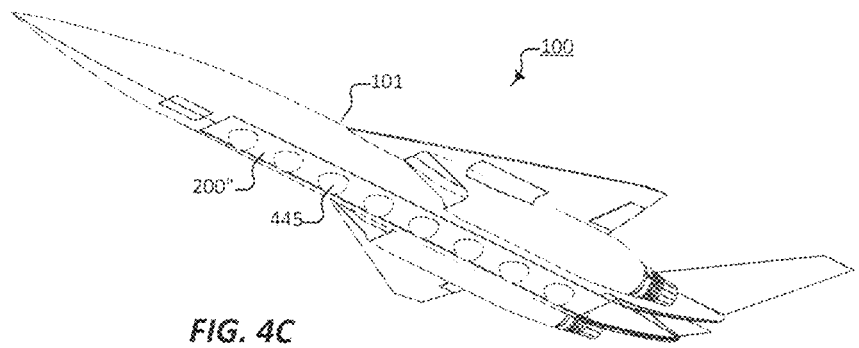
Figure 4D:
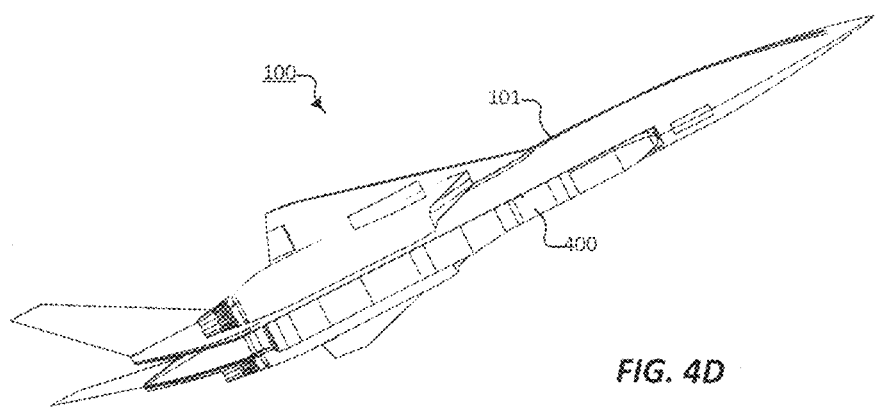
Figure 5A:
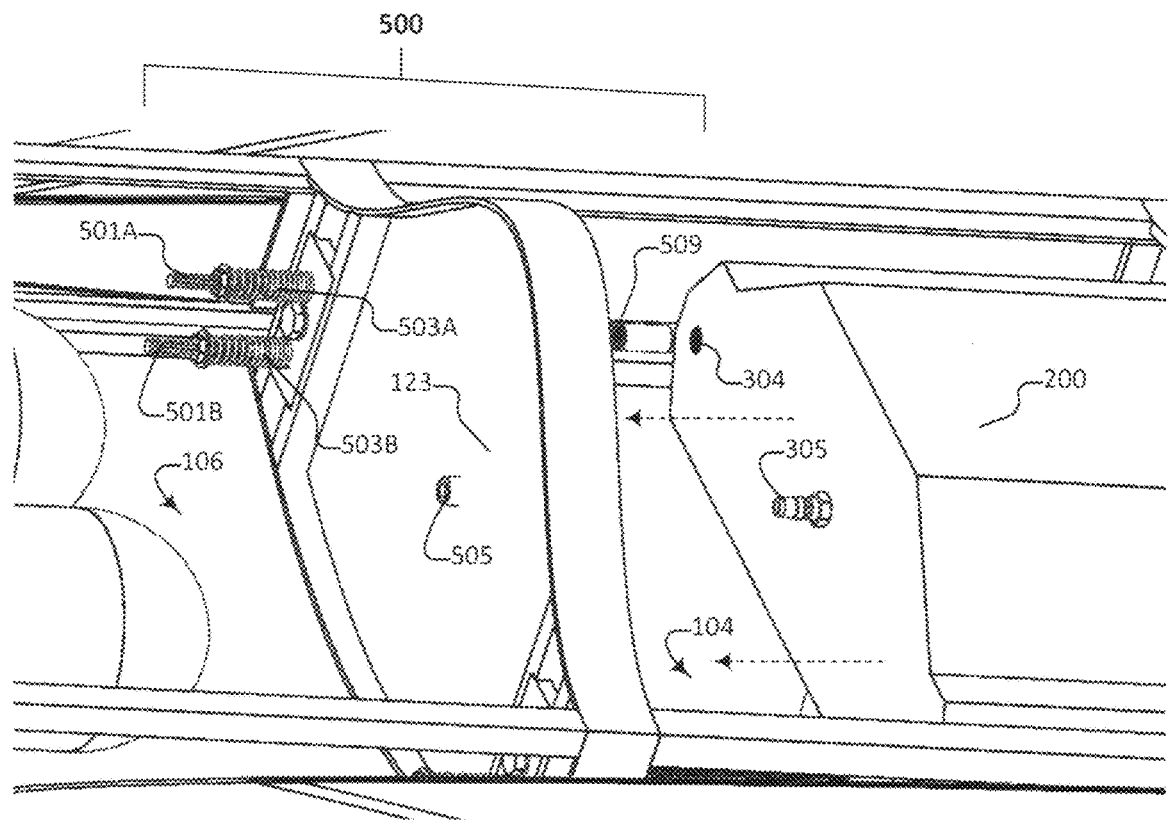
FIGS. 5A through 5F are fragmentary views showing the installation of the exemplary payload module in the payload bay.
Figure 5B:
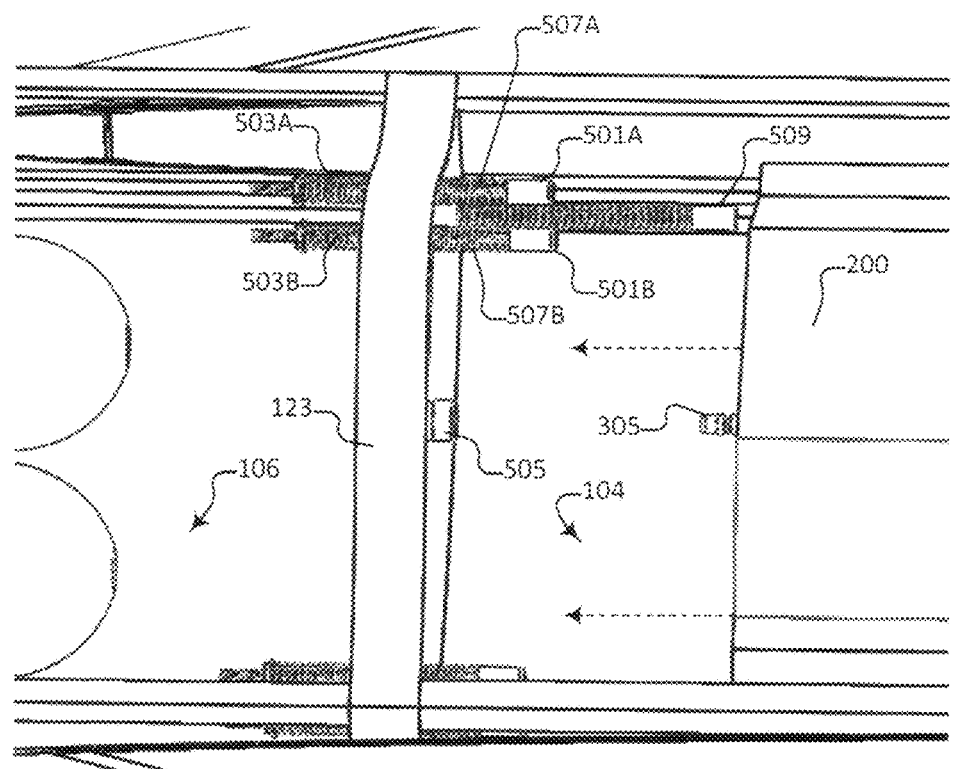
Figure 5C:
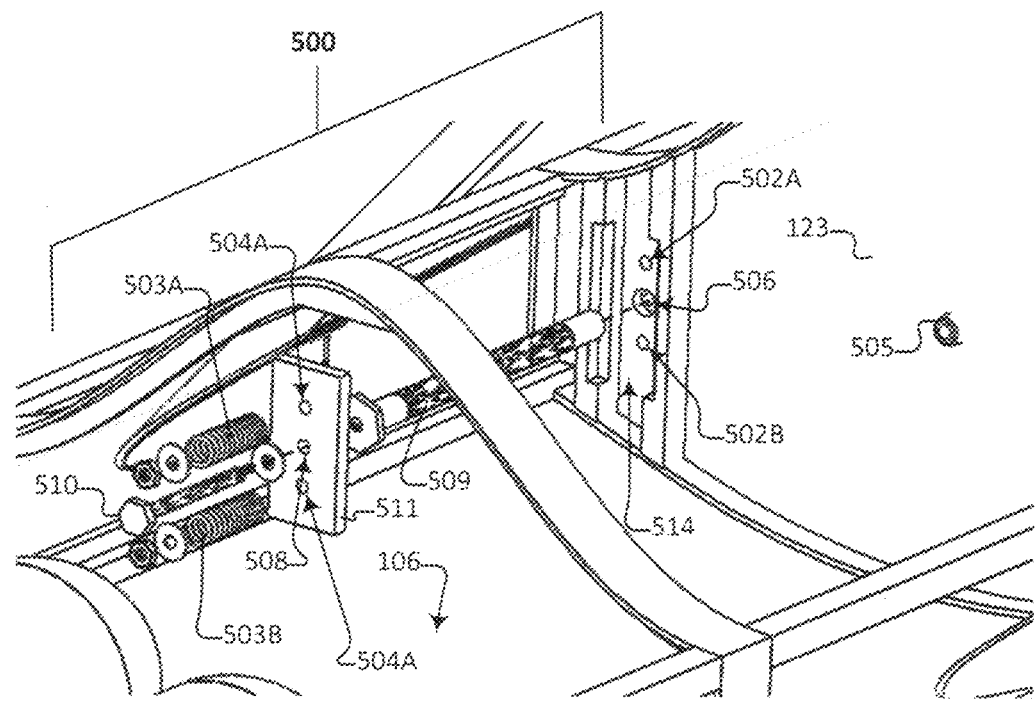
Figure 5D:
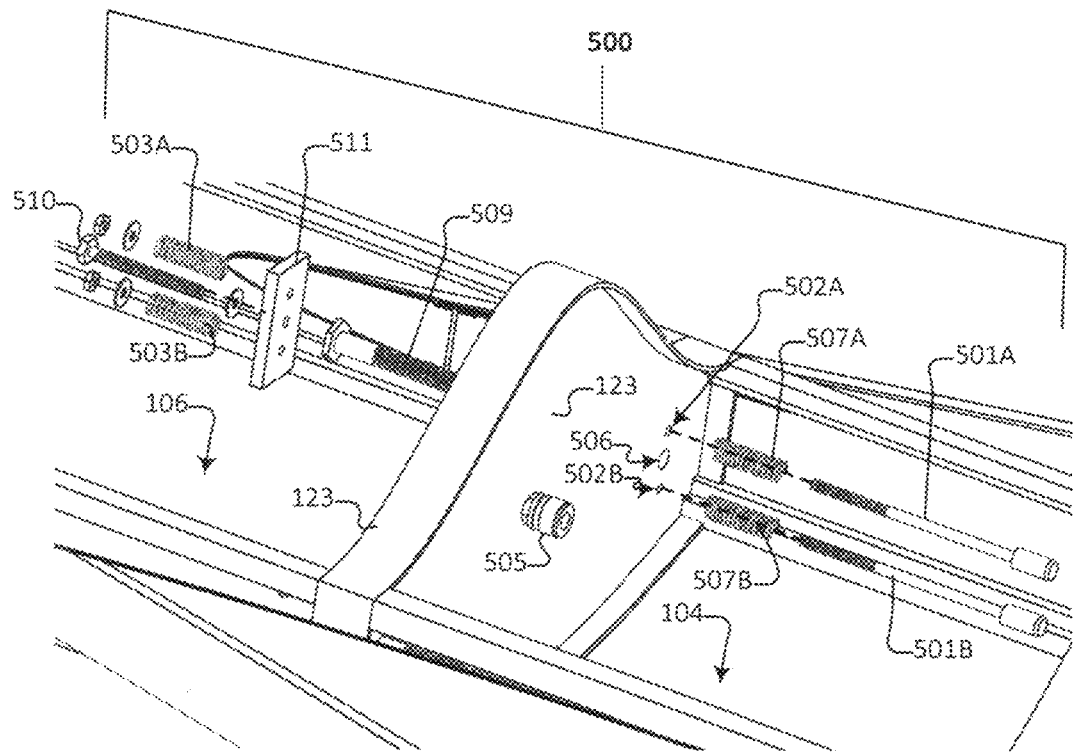
Figure 5E:
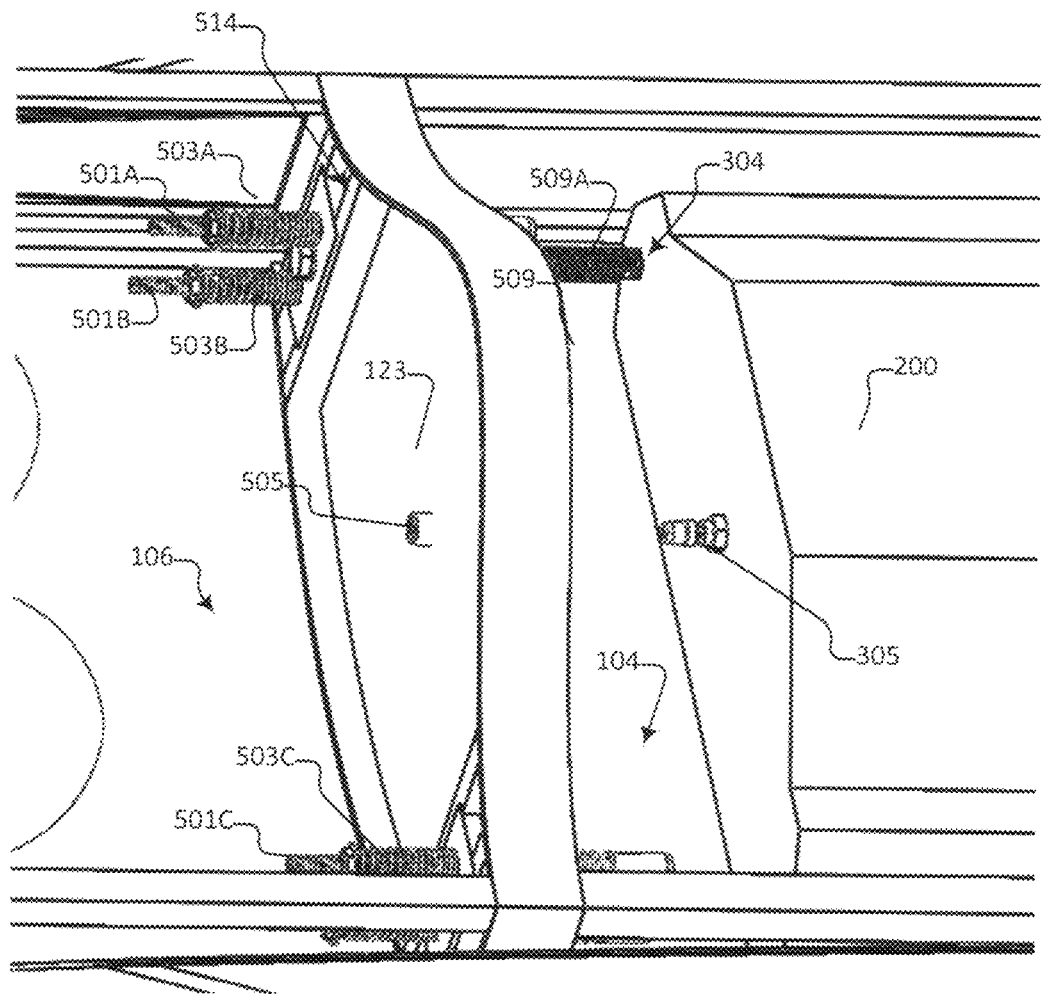
Figure 5F:
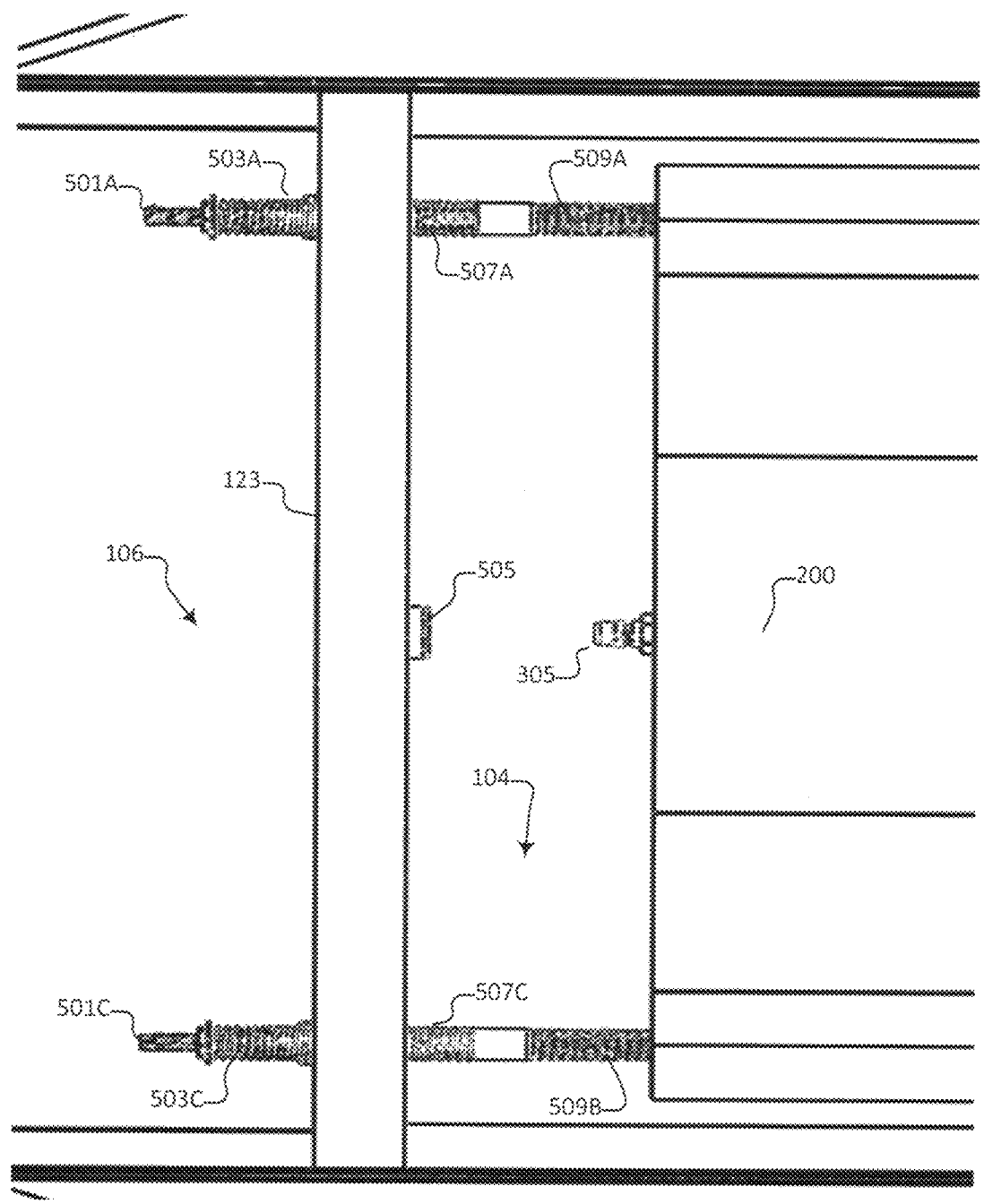

Cargo module 200' may be used to transport cargo and fulfill air logistics functions. Cargo module 200' comprises a container structure which encloses cargo inside and has a ventral side configured such that upon integration to aircraft 100 the ventral surface of the cargo module 200' is flush to the outer mold line of ventral side of the aircraft 100 as shown in FIG. 4C. Cargo module 200' enables rapid cargo transportation and logistics by allowing air shipment to be pre-prepared with or without aircraft 100 at the facility loading shipments to the cargo module 200'.

Drone module 200" may be used to air-deploy delivery drones for last mile delivery services. Drone module may have one or more drone pods 445 with a delivery drone 443 in each drone pod 445. Each delivery drone may be pre-integrated with packages and specific home addresses. aircraft 100 integrated with drone module 200" may take off from origin, fly to destination, and release the delivery drones 443 by opening the drone pods 445. Once the drone pods 445 are open, delivery drones 443 may undock from the integrated drone module 200" and perform the last mile delivery service to their respective home destinations. Once the delivery is made, the delivery drones 443 may return to aircraft 100 and dock to the integrated drone module 200" for a return trip to the origin or to another destination, such as the next delivery zone. The drone module 200" enables the deployment of last mile delivery drones 443 quickly to areas requiring home, work, business, etc. delivery services. It will be appreciated the UAS described herein drastically extends the service range of last mile delivery drones 443 because the range of aircraft 100 is far greater than the limitations of delivery drones 443. Aircraft 100 is also drastically faster than delivery drones and thus drone module 200" makes last mile deliveries faster, more efficient, and optimum.

As suggested by FIGS. 2&3 and the accompanying description, a rocket vehicle 400 may be installed in payload module 200, the completed assembly hereafter referred to as a "launch module" 401. Launch module 401 may be used for deployment of a rocket vehicle 400, e.g., a rocket, which, in turn, is used for suborbital, orbital, or supraorbital launch of rocket-launched payloads. Launch module 401 may be completely self-contained with one or more flight computers, one or more instrumentation, one or more mechanisms and subsystems for capturing and performing the separation of rocket vehicles in flight, one or more fluid systems, one or more electrical systems, one or more communication systems, etc.

Any suitable rocket vehicle 400 may be integrated to payload module 200 to become the launch module 401. Rocket vehicle 400 may be space launch systems such as rocket vehicles or stages, rocket planes, spacecraft, satellites, etc. Space launch systems may also be combinations of multiple space launch systems, such as rocket stages with spacecraft systems, or rocket planes with rocket stages. In particular, an exemplary combination of space launch systems comprises one or more rocket stages with spacecraft systems is a rocket stage with imaging instrumentation at the forward end of the stage and solar panels on the side of the stage. The solar panel folds out in space providing electrical power for the stage and the entire stage functions as a spacecraft. This reduces space debris and enables multi-use of the, otherwise, expended rocket stage.

Figure 6:
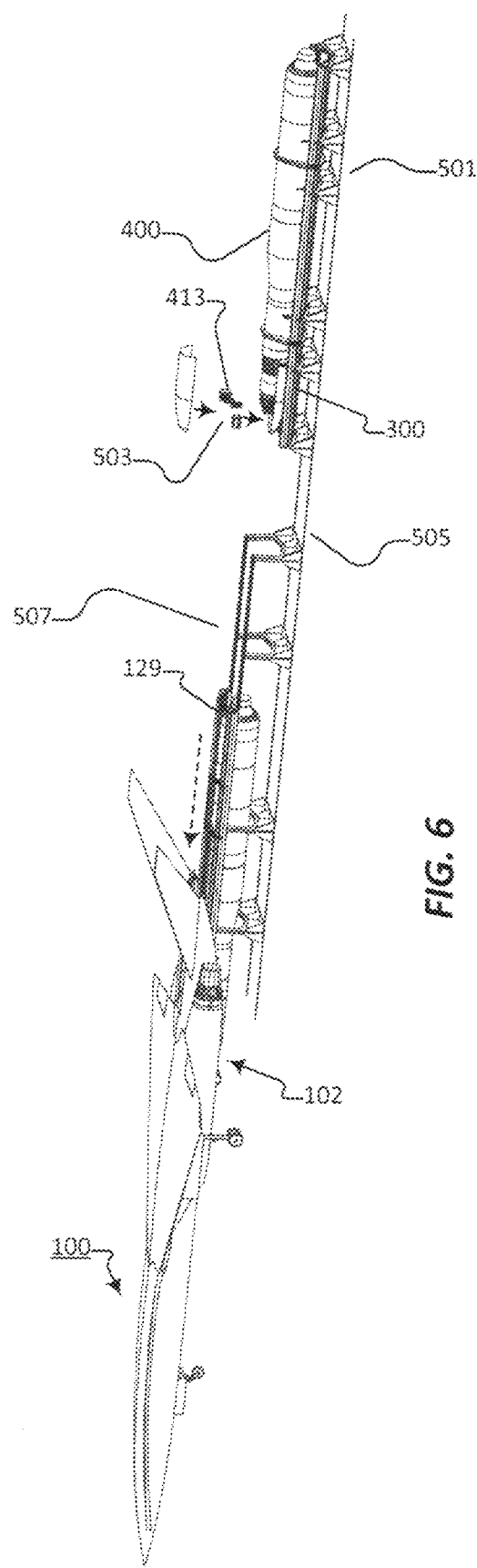
FIG. 6 illustrates a payload loading and installation evolution.

FIG. 6 shows the loading evolution where, at step 601, a rocket vehicle 400 is installed with one or more payloads 613, for example, a small, i.e., micro satellite. The payload module 200 is oriented such that the ventral cavity 302 is upward. The rocket vehicle 400 is placed within the ventral cavity 302 of the payload module 200, and connected thereto with the mechanisms mentioned above, the combination rocket vehicle 400 and payload module 200 now referred to as the launch module 401. Once the launch module is integrated, it is rotated at step 603 such that the rocket vehicle 400 is positioned downward. Between steps 601 and 603, ground support and servicing equipment may be used to connect and access onboard systems on the rocket vehicle 400 through connection openings 305 for integration qualification, testing, acceptance, troubleshooting, modifications, etc. In step 605, the launch module 401 is inserted into the opening 102 of the aircraft 100 for integration in the payload bay 104.

With reference to FIGS. 5A through 5F the aircraft 100 advantageously utilizes the launch module 401 that allows for pre-integration of rocket vehicle 400, payloads 713, separation mechanisms 309, ignition system, launch support systems, ground support systems, and acceptance, qualification, flight, integration, assembly, maintenance, and test processes independent of the aircraft 100. This configuration prevents the aircraft 100 from being taken out of service for new integration efforts and drastically increases mission availability. The rail guides 129a, b insure that all connection openings 305 are aligned properly to matching openings 139 on the aircraft 100. There are two left and right securing mechanisms, each with a redundant lock for reliability. The securing mechanisms are pre-loaded with compression members to mitigate the deleterious effects resulting from vehicle expansion and contraction due to temperature without sacrificing security of the payload module 200 to the aircraft 100 and are optimized to reduce flight loads on the rocket vehicle 400 and the payloads 713.

The bulkhead 127 may be configured with one or more quick connect fittings 505 for coupling with the one or more corresponding payload module connection openings 305 on the forward end of the payload module 200. The bulkhead 127 is further fitted with one or more threaded bolts 509a, b extending through the bulkhead 127 aftward into the payload bay 104 through a corresponding number of bore holes 506 defined in the bulkhead 127.

When the payload module 200 is at its forwardmost position in the bay 104, the bolts 509a, b are inserted into the corresponding holes 304 in the forward wall of the payload module 200. The holes 304 may be threaded such that they threadably mate with the bolts 509a, b, thus, coupling the payload module 200 to the airframe of aircraft 100. However, any suitable mating types may be used. The threaded bolts 509a, b also provide a guide to insure the payload module 200, and thus the quick disconnect fittings 305, 505, are aligned properly during the loading evolution. Although not illustrated, a connector with multiple pins may couple the two the payload module 200 and aircraft 100 together in a similar fashion to the way the quick connect fittings 305 and 505 provide connections. An example of a multiple pin connector is a 30-pin connector. The 30-pin connector may provide communication between aircraft 100 flight management system and the avionics of rocket vehicle 400. There may also be additional quick disconnects like 305, 505 to provide fluid connections.

One or more dampening assemblies 500 are provided to reduce longitudinal displacement of the payload module 200 during flight due to expansion and contraction of the airframe. It should be understood that the referenced drawings depict one assembly disposed on one side of the aircraft. The description that follows is directed to such assembly 500 for clarity of this description. However, it will be appreciated that in such a configuration, a counterpart assembly 500 should be present on the opposite side of the aircraft 100.

The assembly 500 is supported by the bulkhead 127 and extends longitudinally forward and rearward into both bays 106, 104. The assembly comprises forward dampening members 503a, b and rear dampening members 507a, b supported by a pair support rods 501a, b that are through respective bore holes 502a, b defined in either lateral side of the bulkhead 127. The bulkhead 127 is configured with left and right tracks 513 in which a bearing plate 511 is inserted. Bearing plate 511 comprises a pair of holes 504a, b defined therein that correspond with holes 502a, b in the bulkhead 127. A bolt hole 508 is also defined through the bearing plate 511 through which a fastener 510 is inserted. The fastener 510 engages the forward end of the threaded bolt 509 and thus secures the bearing plate 511 to the end of the bolt 509.

The support rods 501a, b are inserted through holes 502a, b and 504a, b, respectively, and support forward compression members 503a, b the rear ends of which are seated against the forward surface of the bearing plate 511. A pair of rear compression members 507a, b are installed on the rear end of the support rods 501a, b and engage the rear surface of the bulkhead 127. The bulkhead 127 is configured with a track 514 on either side into which the bearing plate 511 is seated. Bearing plate 511 is retained within the track from the interaction of the rear compression members 507a, b with the rear bulkhead 127 surface.

With reference again to FIG. 3C, it can be seen that payload module 200 may further comprise payload service lines 341 which are couple to the payload module quick connect fittings 305. Consequently, when the launch module 401 is integrated with the aircraft 101 and payload module fittings 305 are coupled with the corresponding fittings 505 in the bulkhead 127, payload service lines 341 on launch module 401 connect rocket vehicle 400 systems to systems on the aircraft 100. Payload service lines 341 may be tubing, piping, conduits, or any other suitable connecting means to interface various systems, subsystems, components, and devices on rocket vehicle 400 to various systems, subsystems, components, and devices on aircraft 100. Payload service lines 341 may also convey electrical power, data, pneumatic pressure, hydraulic fluid, and the like. Aircraft 100 payload module 200 connection ports may be male quick disconnects on payload module 200 forward bulkhead 301 with the corresponding female quick disconnects mounted to the bulkhead 127, or vice versa. Other examples of connection interfaces include 30-pin electrical connectors, flanged coupling connections, flexible hose connections, barbed connections, pressed-fit connections.

The UAS enables parallel mission and vehicle integration even while the UAS is performing a different mission such that when it returns, the next mission is ready for deployment. Furthermore, the UAS enables the operator to drastically optimize multiple missions to numerous destinations and types to maximize the efficiency and utility of aircraft 100. The use of any suitable quick connect fittings 305, 505 enable payload module, its mission, and hardware to be assembled, pre-integrated, and qualified on the ground independent from unmanned aircraft systems, then quickly integrated to the UAS quickly. As a result, the UAS described herein significantly decreases the integration time and increase the availability of unmanned aircraft systems drastically.

It must be re-iterated that while the launch module 401 is, sometimes illustrated herein as a suitable example, to be inserted into the opening 102 of aircraft 100 and urged forward in a sliding motion atop of linear guide rails 135, this is merely an illustrative example. Any suitable guiding system, design, and/or method may be used. As an example, Teflon coating on the contact surfaces between aircraft 100 and launch module 401 may be used in place of linear rails while matching geometry between payload bay 104 and payload module 200 may provide the self-guiding function during integration. Any suitable system may be used to provide the similar function as linear rails 129a, b.

Aircraft 100 may have one or more thermal coatings on the interior and/or exterior surfaces for thermal protection against aerodynamic heating and other heating throughout its operation. Examples of thermal coating include ceramic tiles, radiative paint, etc.

Figure 8:
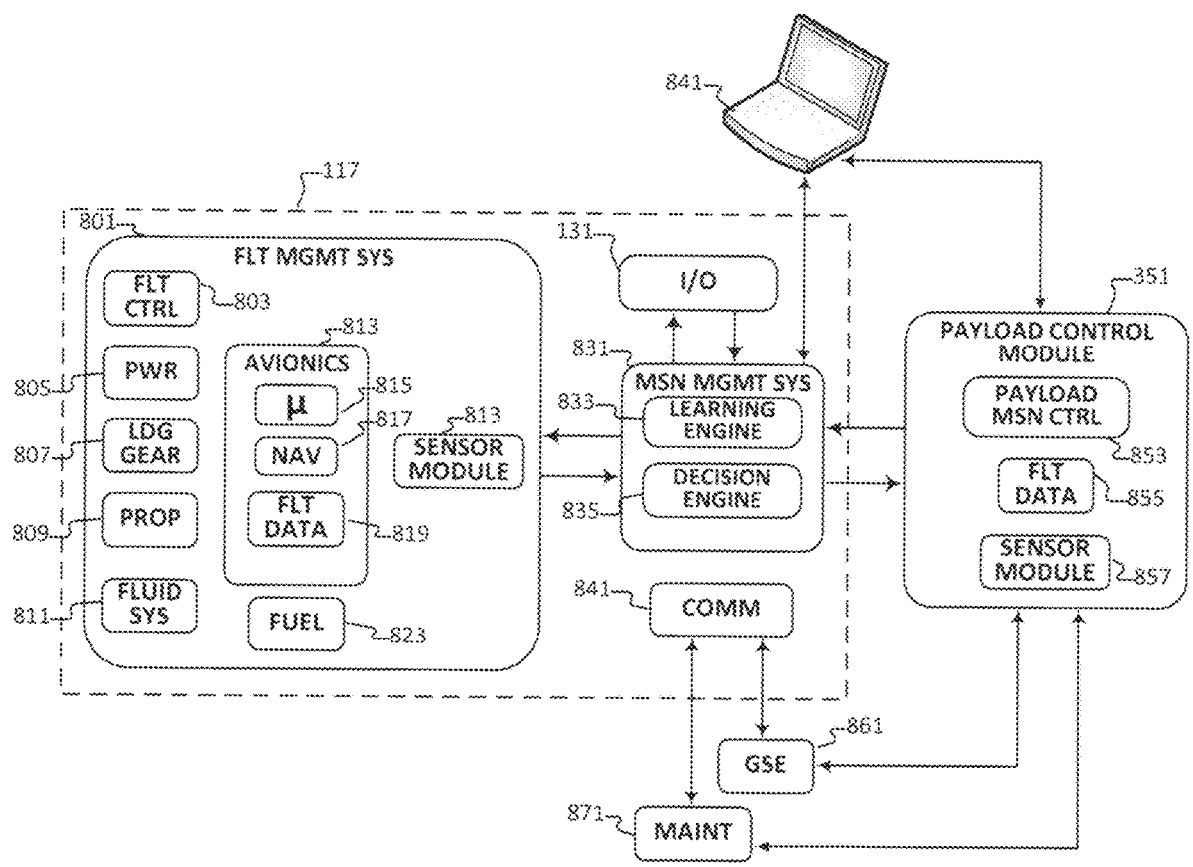
FIG. 8 is a functional schematic depicting the architecture of the flight and mission management systems and the payload module control system.

FIG. 8 is a functional schematic depicting the architecture of the flight and mission management systems 117 and the payload module control system 351. Flight management system (FMS) 801 performs the functions of conventional flight computers, intaking flight data 839, such as airspeed, air pressure, and navigation data 817, including GPS coordinates. The FMS 801 also provides control functions for flight subsystems: flight control 803, power 805, landing gear 807, propulsion 809, fluid (e.g., hydraulic) 811 and fuel 823.

Mission management system (MMS) 831 controls aspects of mission performance, redundancy, contingency management and mission coordination. Preferably, the MMS 831 is two or more computer processors, and preferably three processors, for redundancy and mission reliability. In one embodiment, the MMS 831 comprises three processors, each configured to provide input to the overall mission system, using a voting algorithm. MMS 831 receives data from the FMS 801, such as navigation and air data information to allow the MMS 831 to carry out the assigned mission.

Notably, the FMS 801 may also comprise a sensor package 813 which includes cameras, IR/UV sensors, radar and the like. Data from the sensor module 813 is provided to the MMS 831 which preferably comprises a graphics processing unit (CPU) to process the sensor data efficiently. Mission management system 831 is further configured with software algorithms referred to herein as a learning engine 833 and a decision engine 835. The learning engine 833 and the decision engine 835 receive data from the FMS, including flight data 819, navigation data 817, and data from the sensor module 813. Learning engine 833 is configured to allow the MMS to remember the flight characteristics and environment (collectively: mission history) at various moments in the mission, for example, saving the data to a database configured in a computer-readable memory. Decision engine 835 compares mission histories to current circumstances and decides whether to order a change in a flight parameter or to alert a ground operator.

For example, over the course of hundreds of missions flown, the MMS 831 could change its own flight control sensitivity coefficients, or fuel performance margins. In this manner, the learning engine 833 and the decision engine 835 allow the MMS 831 to learning the optimum techniques to fly and carry out its missions.

As described above, the payload module 200 comprises its own payload control module (PCM) 351, including one or more computer-based machines for payload mission control 853, and payload flight data 855. Preferably, payload control module 351 also includes a sensor package 857 like that of the FMS. Again, data from the PCM including the sensor package 857 are provided to the learning and decision engines 833, 835.

Another advantage of the system configuration is that all elements of the FMS, the MMS, and the PCM are configured to communicate data among each other, either wired or wirelessly. For that matter, the respective systems are configured to communicate with compatibly configured ground support equipment (GSE) 861 and maintenance equipment 871.

Moreover, in a preferred embodiment, operators may access the MMS 831 and the PCM 351 using either an onboard input/output device 131 or a remote computer 841. Consequently, flight and mission computers may be re-programmed on the fly, so to speak, instead taking the plane 100 out of service to reconfigure the plane's computers.

As described above, many of the functions of the system are performed by computer-based machines. The computers may be uniprocessor or multiprocessor machines. Additionally, these computers include an addressable storage medium or computer accessible medium, such as random access memory (RAM), erasable programmable read-only memory (EPROM), read-only memory (ROM), hard disks, floppy disks, laser disk players, optical disk players, digital video devices, and other components operable to transmit and/or store data. The verification tool is advantageously configured reside on the addressable storage medium and configured to execute on one or more processors.

The detailed description that follows is presented largely in terms of processes and symbolic representations of operations performed by conventional computers, including computer components. A computer may be any microprocessor or processor (hereinafter referred to as processor) controlled device, such as, by way of example, personal computers, workstations, servers, clients, mini-computers, main-frame computers, laptop computers, a network of one or more computers, mobile computers, portable computers, handheld computers, wireless devices, or any combination thereof. The computer may possess input devices such as, by way of example, a keyboard, a keypad, a mouse, a microphone, or a touch screen, and output devices such as a computer screen, printer, or a speaker.

Figure 9:
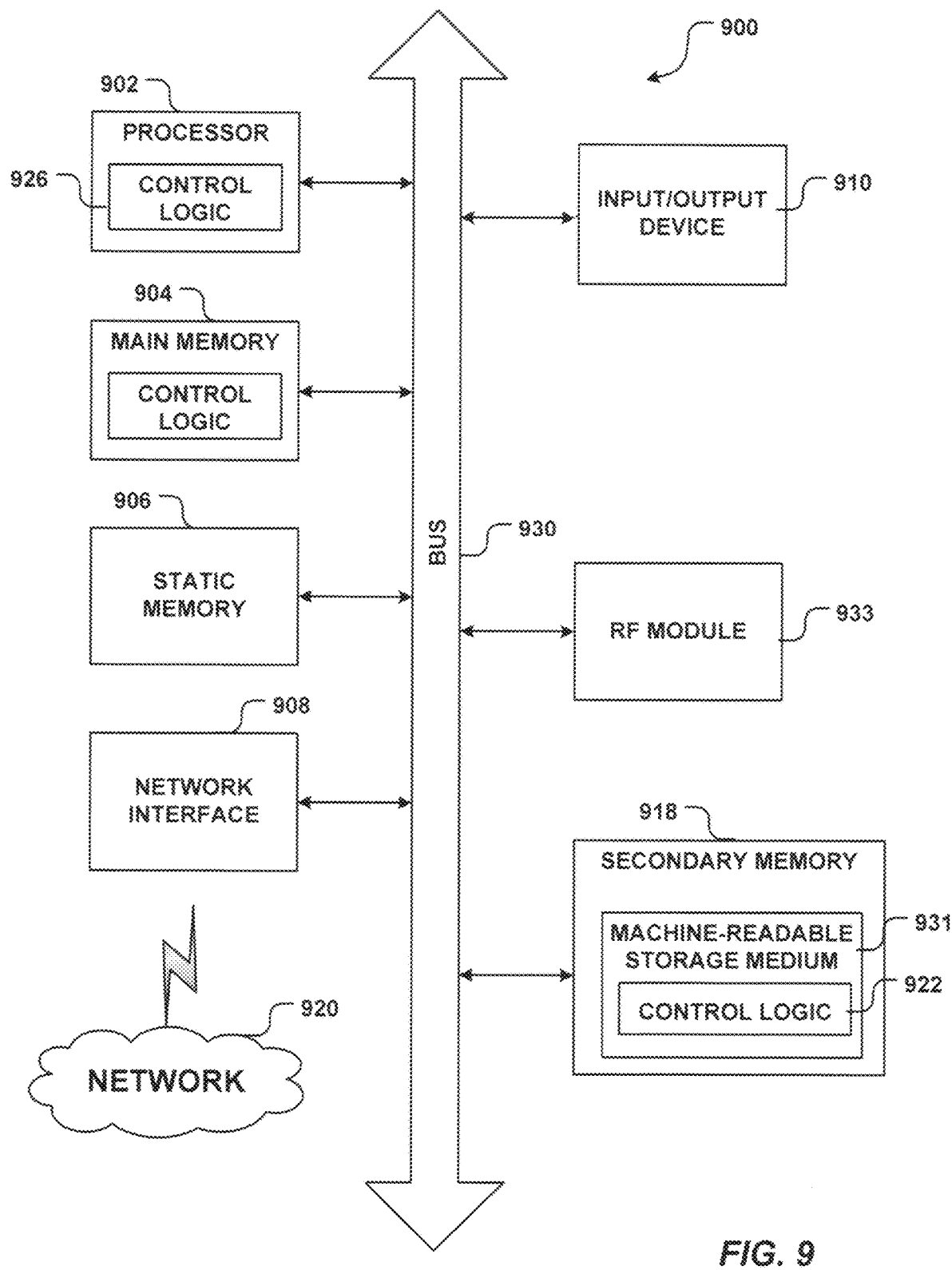
FIG. 9 is a functional schematic of a computer-based machine that may be used to perform the control functions of the exemplary unmanned aircraft.

FIG. 9 presents a functional schematic of a computer-based machine 900 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet, via ethernet, or wireless communications, now known or hereafter developed. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 one or more processors 902, a main memory 904 (e.g., read-only memory (ROM), flash memory, dynamic random access memory (DRAM) such as synchronous DRAM (SDRAM) or Rambus DRAM (RDRAM), etc., and may comprise a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the control logic 926 for performing the operations discussed herein.

The computer system 900 may further include a network interface device 908 for allowing communication with the aforementioned networks. The computer system 900 preferably comprises an input/output device, for example a, display unit 910 which may be light emitting diode (LED), liquid crystal display (LCD), organic light emitting diode (OLED), or the like. Further, input/output device may also be a touch-sensitive screen.

The secondary memory 918 may include a machine-readable storage medium (or more specifically a computer-readable storage medium) 931 on which is stored one or more sets of instructions (e.g., software 922) embodying any one or more of the methodologies or functions described herein. The software 922 may also reside, completely or at least partially, within the main memory 904 and/or within the processing device 902 during execution thereof by the computer system 900, the main memory 904 and the processing device 902 also constituting machine-readable storage media. The software 922 may further be transmitted or received over a network 920 via the network interface device 908, or via wireless communications via a radio frequency (RF) communications module 933 which is configured to allow RF communications with devices having compatible communications protocols, e.g., IEEE protocol standards 802.11, 802.15, or the like.

Figure 7A:
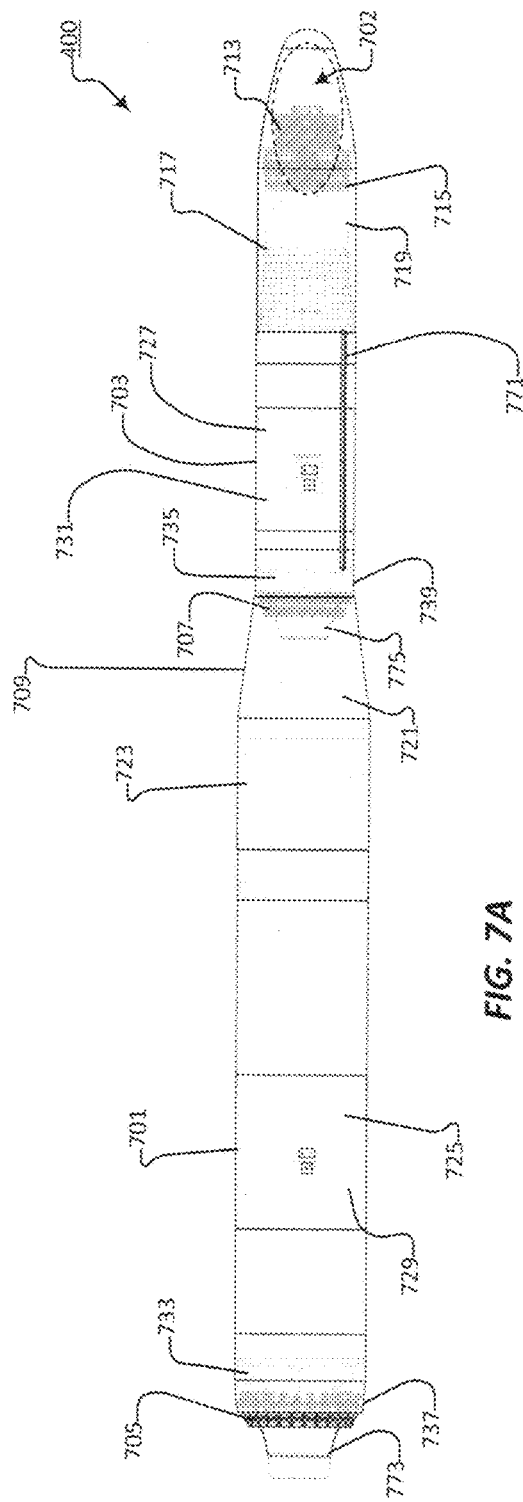
FIGS. 7A & 7B show an exemplary rocket vehicle which may be used as a payload for an unmanned aircraft.
Figure 7B:
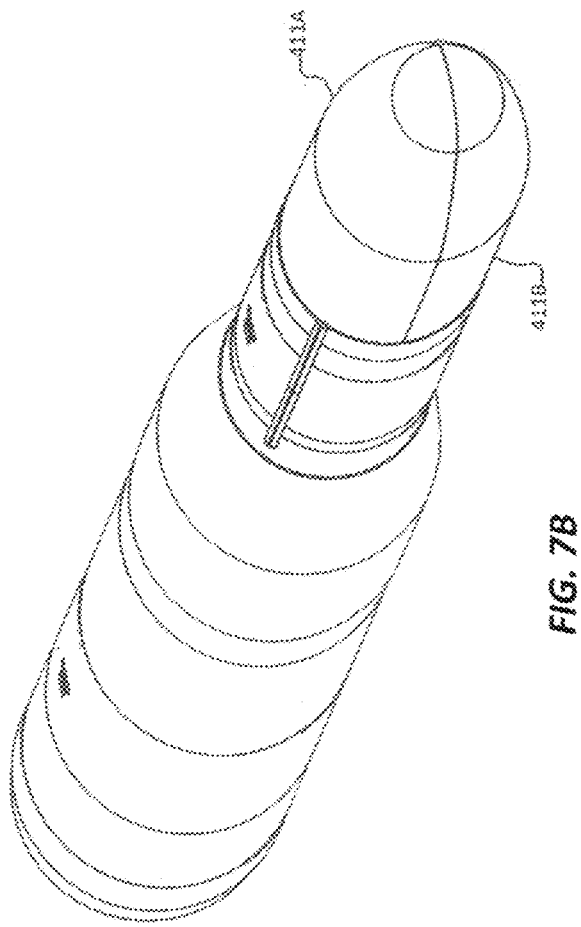

An exemplary rocket vehicle 400 is shown in FIGS. 7A & 7B. Rocket vehicle 400 is comprised of first stage 701 and second stage 703 and the main propulsive power is provided by engines 705 and 707, respectively. First stage 701 and second stage 703 are joined at opposing ends by inter-stage 709 in a conventional manner for selective release upon expiration of first stage 701 in flight. Rocket vehicle 400 comprises of fairings 711*a, b* for aerodynamics and heat shielding as well as to protect the payload. The payload 713 is stored in a payload bay 702 at the forward section of second stage 703. Avionics 715 are located just below payload 713 mounted to adapter structure 717. Adapter structure 717 connects the forward end of second stage 703 to payload 713. Second stage pressurant tank 719 is mounted to adapter structure 717. Third stage pressurant tank 721 is mounted to first stage adapter 723.

The first and second stage propulsion uses any suitable solid fuel propellant with any suitable cryogenic oxidizer. A non-limiting example of a solid fuel propellant may be a composite propellant forming a heterogeneous propellant grain with ammonium perchlorate crystalline oxidizer and aluminum fuel in a polybutadiene matrix. An example of a cryogenic oxidizer is liquid oxygen. This combination is merely an illustration and the fuel and oxidizer may be any suitable propellant combinations. Alternative examples include liquid fuel and liquid oxidizer such as kerosene or rocket propellant-1 (RP-1) and liquid oxygen or 93% hydrogen peroxide and RP-1 or an entirely solid propellant fuel and oxidizer in combination. In the preferred embodiment, first stage 701 and second stage 703 oxidizer is stored in tanks 725 and 727, respectively. First stage 701 and second stage 703 fuel is stored in tanks 729 and 731, respectively. The tanks 725, 727, 729, and 731 may be constructed of metal, non-metal, composite, or any suitable material. In the preferred embodiment, the oxidizer tank materials may be carbon composite with aluminum as the liner and the fuel tank materials may be carbon composite. Materials for tank bosses, not shown, may be metal such as aluminum, stainless steel, etc.

Thrust structure 733 joins first stage engine 705 to the aft end of tank 729. First stage aft skirt is mounted to tank 729 providing an aerodynamic shroud for rocket vehicle 400. Thrust structure 735 joins second stage engine 707 to the aft end of tank 731. Second stage aft skirt 739 is mounted to tank 731 providing an aerodynamic cover for second stage 703. Second stage raceway 741 mounted to the side of second stage 703 serves as an aerodynamic cover for fluid, electrical, pneumatic systems of second stage 703.

Attitude control of rocket vehicle 400, first stage 701, and second stage 703 is provided by conventional attitude control systems such as electromechanical thrust vector control of engines 705 and 707 for pitch and yaw control. Roll control may be provided by attitude/reaction control systems, not shown, located at the forward end of second stage 703. Thrust vector control of engines 705 and 707 may employ gimbal (not shown) to actuate the entire engines 705 and 707. Any suitable thrust vector control system may be employed such example is control surfaces located on first stage aerospike nozzle 743 and second stage aerospike nozzle 745. This is merely an illustration, however, if the latter system is employed, the thrust vector control system will also provide roll control. A further modified example is to use grid fins as the control surface of the latter thrust vector control system design. Attitude/reaction control system may consist of cold gas thrusters using nitrogen gas or mono-propellant thruster such as hydrogen peroxide or hydrazine thrusters with catalysts such as silver or aluminum oxide coated with iridium, respectively. Any suitable thrust vector control system and attitude/reaction control system may be used.

Although not shown, aerodynamic control surfaces such as fins, wings, or both may be employed to provide lift and control authority of rocket vehicle 400.

In the preferred embodiment, second stage 703 is smaller in diameter than first stage 701.

Avionics for flight control of rocket vehicle 400 is located within second stage 703 inside of the second stage adapter 719. Avionics includes guidance, navigation, and control computers, inertial measurement units, GPS units, communication units, telemetry units, microcontrollers, as well as data acquisition systems and instrumentation units.

Communication system is comprised of radios, front end processor, amplifiers, and antennas. Radios are preferably software defined radios (SDR), DVB-S2 dynamic coding & FEC, Ethernet input and S-band IF output, full duplex. There are a total of eleven antennas on second stage 703. Four omni-directional antennas for receiving communication data and four omni-directional antennas for transmitting communication data. There are three directional antennas for transmission of data requiring high bandwidth.

Fairing 711*a, b* covers payload 713 and adapter 717 and provides aerodynamic and heat shield functions. Fairing 711*a, b* separate, normally after second stage ignition, but exact timing of the fairing separation varies based on the mission. Fairing 711*a, b* are joined together using pneumatic actuator arms and release latches that are also pneumatically actuated. Fairing 711*a, b* are joined to the forward end of second stage 703 using conventional mechanisms.

Mission profiles may be pre-planned way points, autonomously navigated, remotely-piloted, or any other suitable profile that results to fit any given mission.

Figure 10:
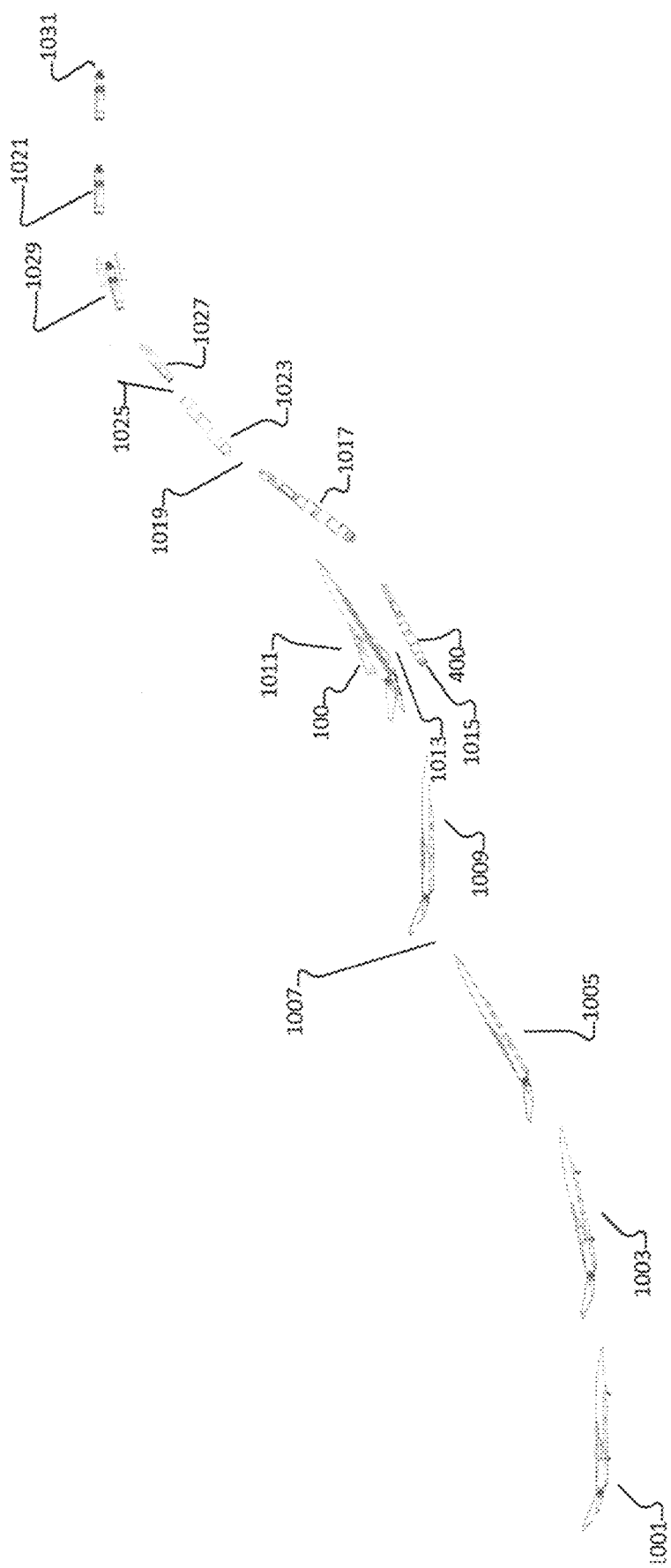
FIG. 10 depicts an exemplary launch mission profile which may be executed by an unmanned aircraft as described herein.

FIG. 10 depicts an exemplary launch mission profile. Aircraft 100 with launch module 401 utilizes any suitable runway for horizontal take-off 1003 from origin 1001 and proceeds to perform the mission which includes ascent phase 1005, which may include cruise flight phases and combinations of ascent, descent, and cruise as necessary for any suitable mission. Drop area 1007 may be pre-determined by the mission management team. Upon reaching drop area 1007, aircraft 100 performs max acceleration phase 1009 then performs pitch up maneuver 1011 to separation point 1013 and performs rocket vehicle 400 separation at time T=0 seconds. Max acceleration phase 1009 may accelerate aircraft 100 to subsonic or supersonic velocities before reaching separation point 1013. Higher velocity will generally result in a higher amount of payload to orbit as more energy is contributed by aircraft 100 to the mission and decreases energy requirements of rocket vehicle 400. In this illustrated example, the velocity at separation point 1013 is Mach 1.45. Flight velocity at separation point 1013 may be any suitable velocity for any mission and is determined on a mission-by-mission basis. Pitch angle of aircraft 100 at separation point 1013 may be any angle but preferably between 15 degrees to 75 degrees, however in this illustrated mission profile the pitch angle of aircraft 100 at separation point is 40 degrees. At any suitable drop time and physical separation distance of rocket vehicle 400 from aircraft 100, rocket vehicle 400 proceed to ignition of first stage 401 at point 1015 and rocket vehicle 400 establishes its own flight. Rocket vehicle 400 performs pitch up flight phase 1017 to push over point 1019. Rocket vehicle pitch angle relative to local horizon is 48.2 degrees at push over point 1019 at time T+59 seconds. At push over point 1019, rocket vehicle 400 proceeds to pitch down flight phase. At a suitable point in the mission profile, first stage 701 burn out occurs at point 1023 followed by stage separation 1025. In this example, first stage burn out occurs at point 1023 at time T+118 seconds After any suitable coast period following stage separation 1025, second stage ignition 1027 occurs and second stage 703 establishes its own flight. Fairing separation occurs at point 1029, which may be any suitable time in any suitable mission profile, normally after stage separation 1025 and when the free molecular heating is below 1,135 W/m-m. In this example, fairing separation point 1029 occurs at time T+126 seconds. Orbital insertion occurs at point 1021, which is at time T+423 seconds in this example. Any suitable time after orbital insertion point 1021, payloads release phase occurs at point 1031.

Altitude at separation point 613 may be any suitable altitude. In this particular example, the altitude is 70,000 feet. Max dynamic pressure occurs at time T=18 seconds at an altitude of about 74,000 feet.

It should be noted that higher velocities at separation point 103 at the optimum pitch angle of aircraft 100 results in increases in the payload mass delivered to orbit. Furthermore, the shortest free fall time and distance from aircraft 100 of rocket vehicle 400 results in further increases in the payload mass delivered to orbit. The present invention enables the most optimum air-launch trajectories to orbit. These trajectories are not possible with quasi-similar air-launch methods involving human pilots on-board the carrier aircraft with increasing the risk and significantly reducing the safety of human lives onboard the carrier aircraft.

As described above and shown in the associated drawings, the present disclosure is directed to an adaptive autonomous aircraft system with modular payload systems. While particular embodiments have been described, it will be understood, however, that any invention appertaining to the system described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A payload delivery system comprising:
   an aircraft comprising:
   a ventral surface and an empennage with an elongated cavity defined within the aircraft and extending from the rear of said empennage to a transverse bulkhead disposed within said aircraft, said transverse bulkhead having at least one payload service connection and at least one payload module securement fitting;
   a computer-based mission controller adapted to autonomously cause said system to execute payload delivery missions, said mission controller being configured with a computer-readable memory in which is stored one or more mission histories, and a learning engine and a decision engine, said learning and decision engines operable to autonomously adjust flight parameters in response to unplanned circumstances; and
   a reusable payload module adapted to provide a loading interface between said aircraft and a payload, and dimensioned to be seated within the elongated cavity, said module having a forward module bulkhead having at least one module service connection corresponding to said payload service connection and at least one fitting corresponding to said at least one payload module securement fitting and configured to mate therewith.

2. The payload delivery system of claim 1, wherein said payload is one of a rocket, cargo, and at least one drone aircraft.

3. The payload delivery system of claim 2, wherein said payload is a rocket and wherein said payload module comprises:
   a ventral cavity dimensioned to receive said rocket;
   a plurality of attachment means for retaining said rocket within said ventral cavity; and
   one or more service lines corresponding to said at least one module service connection with a first end connection thereto and a second end connected to said rocket.

4. The payload delivery system of claim 3, wherein said rocket comprises a deployable space vehicle, said space vehicle comprising one of a suborbital vehicle, an orbital vehicle, and a supraorbital vehicle.

5. The payload delivery system of claim 4, further comprising at least one computer-based payload controller housed within said payload module.

6. The payload delivery system of claim 5, further comprising a payload controller user interface accessible from said payload module.

7. The payload delivery system of claim 2, wherein said payload is cargo, and wherein said payload module comprises a ventral surface formed such that said ventral surface is flush with said aircraft ventral surface when said payload module is seated within said cavity.

8. The payload delivery system of claim 1, wherein said at least one payload module securement fittings further comprise dampeners.

9. The payload delivery system of claim 1, wherein said aircraft further comprises a user interface responsive to said mission controller.

10. The payload delivery system of claim 1, wherein said aircraft further comprises a status indicator light.

11. The payload delivery system of claim 1, wherein said aircraft comprises an airframe adapted for supersonic flight.

12. The payload delivery system of claim 11, wherein said payload is one of a rocket, cargo, and at least one drone aircraft.

13. The payload delivery system of claim 12, wherein said payload is a rocket and wherein said payload module comprises:
    a ventral cavity dimensioned to receive said rocket;
    a plurality of attachment means for retaining said rocket within said ventral cavity; and
    one or more service lines corresponding to said at least one module service connection with a first end connection thereto and a second end connected to said rocket.

14. The payload delivery system of claim 13, wherein said rocket comprises a deployable space vehicle, said space vehicle comprising one of a suborbital vehicle, an orbital vehicle, and a supraorbital vehicle.

15. The payload delivery system of claim 14, further comprising a computer-based payload controller housed within said payload module.

16. The payload delivery system of claim 15, further comprising a payload controller user interface accessible from said payload module.

17. The payload delivery system of claim 12, wherein said payload is cargo, and wherein said payload module comprises a ventral surface formed such that said ventral surface is flush with said aircraft ventral surface when said payload module is seated within said cavity.

18. The payload delivery system of claim 11, wherein said at least one payload module securement fittings further comprise dampeners.

19. The payload delivery system of claim 11, wherein said aircraft further comprises a user interface responsive to said mission controller.

20. A method for delivering a payload comprising:
    providing an aircraft, said aircraft comprising:
        a ventral surface and an empennage with an elongated cavity defined within the aircraft and extending from the rear of said empennage to a transverse bulkhead disposed within said aircraft, said transverse bulkhead having at least one payload service connection and at least one payload module securement fitting;
        a computer-based mission controller adapted to autonomously cause said system to execute payload delivery missions, said mission controller being configured with a computer-readable memory in which is stored one or more mission histories, and a learning engine and a decision engine, said learning and decision engines operable to autonomously adjust flight parameters in response to unplanned circumstances;
    providing a reusable payload module adapted to provide a loading interface between said aircraft and a payload, and dimensioned to be seated within the elongated cavity;
    equipping said payload module with said payload; and
    installing said payload module within said elongated cavity; and
    connecting said payload module to said aircraft transverse bulkhead via said at least one payload service connection and at least one payload module securement fitting.

21. The method of claim 20, wherein said payload is one of a rocket, a cargo and at least one drone aircraft.

22. The method of claim 21, wherein said payload is a rocket comprising a deployable space vehicle, said space vehicle comprising one of a suborbital vehicle, an orbital vehicle, and a supraorbital vehicle.

23. The method of claim 20, wherein said aircraft comprises an airframe adapted for supersonic flight.

24. The method of claim 23, wherein said payload is one of a rocket, a cargo and at least one drone aircraft.

25. The method of claim 23, wherein said payload is a rocket comprising a deployable space vehicle, said space vehicle comprising one of a suborbital vehicle, an orbital vehicle, and a supraorbital vehicle.

26. The method of claim 20, further comprising the steps of:
    configuring said mission controller with a delivery mission profile via one of a wired communication protocol and a wireless communication protocol.

27. The method of claim 26, wherein said step of configuring said mission controller is performed via said wireless communication protocol with a remote computer.

28. The method of claim 27, further comprising the step of:
    launching said aircraft; and
    wherein said step of configuring is performed while said aircraft is airborne.

29. The method of claim 20, further comprising the step of:
    configuring said mission controller with a delivery mission profile, wherein said mission controller is autonomously configured.

30. The method of claim 29, further comprising the step of:
    launching said aircraft; and
    reconfiguring said mission controller with a modified delivery mission profile, wherein said mission controller is autonomously reconfigured based upon said mission histories.

* * * * *